(12) United States Patent
Matlin et al.

(10) Patent No.: US 11,666,143 B2
(45) Date of Patent: Jun. 6, 2023

(54) MULTI-POSITIONAL ARTICULATING ERGONOMIC DEVICE WITH MODULAR FEATURES

(71) Applicant: FELLOWES INC., Itasca, IL (US)

(72) Inventors: Tai Hoon Matlin, Round Lake Beach, IL (US); Peter Maletich, Chicago, IL (US); Shawn Michael Applegate, Streamwood, IL (US)

(73) Assignee: FELLOWES INC., Itasca, IL (US)

( * ) Notice: Subject to any disclaimer, the term of this patent is extended or adjusted under 35 U.S.C. 154(b) by 0 days.

(21) Appl. No.: 16/874,437

(22) Filed: May 14, 2020

(65) Prior Publication Data

US 2020/0375353 A1 Dec. 3, 2020

Related U.S. Application Data

(60) Provisional application No. 62/838,141, filed on May 14, 2019.

(51) Int. Cl.
*A47B 23/04* (2006.01)
*A47B 9/16* (2006.01)
(Continued)

(52) U.S. Cl.
CPC ............ *A47B 23/04* (2013.01); *A47B 9/02* (2013.01); *A47B 9/16* (2013.01); *A47B 13/081* (2013.01);
(Continued)

(58) Field of Classification Search
CPC .. A47B 9/02; A47B 9/16; A47B 21/02; A47B 21/04; A47B 2023/049; A47B 17/02; A47B 2200/0043
(Continued)

(56) References Cited

U.S. PATENT DOCUMENTS

| 1,956,546 | A | * | 4/1934 | Froelich | ............... A47B 27/18 |
| | | | | | 108/2 |
| 4,073,240 | A | * | 2/1978 | Fly | ........................ A47B 9/16 |
| | | | | | 108/145 |

(Continued)

FOREIGN PATENT DOCUMENTS

| CA | 2449395 A1 * | 6/2004 | ............ A47B 9/02 |
| DE | 4334241 A1 * | 6/1995 | ............ A47B 17/02 |

(Continued)

OTHER PUBLICATIONS

European Search Report dated Sep. 23, 2021 in European Application No. 21 17 3952.

*Primary Examiner* — Jose V Chen
(74) *Attorney, Agent, or Firm* — Wood, Phillips, Katz, Clark & Mortimer

(57) ABSTRACT

An assembly composing of a robust articulating armature with optionally interchangeable platform like components which incorporate and adapts the core armature assembly into a multitude of product configurations each having ergonomic benefits. The core articulating armature is configured to be a variably lift assisted and repositionable in a manner when combined with the other elements, configures to become a device with demonstrably beneficial features in each of its configurations. In some of the configurations, lift assistance and positional support is the primary feature, whereas in other configurations, flexing and returning back to a user designated set position becomes the primary feature. This application discloses a device with the flexibility to be configured in such a manner as to bring benefits to both the consumer and to the manufacture due to its uniquely modular and configurable elements which can be utilized to create a multitude of ergonomic product configurations.

19 Claims, 25 Drawing Sheets

(51) Int. Cl.
 *A47B 21/02* (2006.01)
 *A47B 13/08* (2006.01)
 *A47B 21/04* (2006.01)
 *A47B 9/02* (2006.01)

(52) U.S. Cl.
 CPC .............. *A47B 21/02* (2013.01); *A47B 21/04* (2013.01); *A47B 2023/049* (2013.01)

(58) Field of Classification Search
 USPC .................................................. 108/145, 7, 9
 See application file for complete search history.

(56) References Cited

U.S. PATENT DOCUMENTS

| | | | | |
|---|---|---|---|---|
| 4,549,767 A | | 10/1985 | Hampshire et al. | |
| 4,558,648 A | * | 12/1985 | Franklin | B66F 7/065 |
| | | | | 108/136 |
| 5,649,493 A | * | 7/1997 | Blume | A47B 9/00 |
| | | | | 108/136 |
| 5,758,849 A | * | 6/1998 | Bui | A47B 9/10 |
| | | | | 248/125.1 |
| 5,823,120 A | * | 10/1998 | Holmquist | A47B 9/02 |
| | | | | 108/147 |
| 6,038,986 A | * | 3/2000 | Ransil | A47B 9/02 |
| | | | | 108/145 |
| 6,283,047 B1 | * | 9/2001 | Haller(-Hess) | A47B 9/02 |
| | | | | 108/145 |
| 6,502,261 B1 | * | 1/2003 | Harwood | A61G 13/02 |
| | | | | 5/611 |
| 6,955,400 B2 | | 10/2005 | Bellvis Castillo | |
| 7,374,137 B2 | * | 5/2008 | Staney | F16M 11/10 |
| | | | | 248/122.1 |
| 7,487,940 B2 | | 2/2009 | Saez et al. | |
| 8,065,966 B1 | * | 11/2011 | Bacon | A47B 9/16 |
| | | | | 108/145 |
| 8,132,518 B2 | * | 3/2012 | Kim | B66F 7/0633 |
| | | | | 108/145 |
| 8,726,814 B1 | * | 5/2014 | Matteo | A47B 9/16 |
| | | | | 108/50.02 |
| 8,800,454 B2 | * | 8/2014 | Jones | A47B 9/02 |
| | | | | 108/10 |
| 9,961,990 B2 | | 5/2018 | Benden | |
| 10,932,561 B2 | * | 3/2021 | Zhang | A47B 21/02 |
| 2003/0154890 A1 | * | 8/2003 | Warner | A47B 9/00 |
| | | | | 108/145 |
| 2004/0256535 A1 | | 12/2004 | Desch | |
| 2007/0266912 A1 | * | 11/2007 | Swain | A47B 9/02 |
| | | | | 108/145 |
| 2015/0289641 A1 | * | 10/2015 | Ergun | A47B 9/18 |
| | | | | 108/42 |
| 2017/0020280 A1 | * | 1/2017 | Chuang | F16M 11/08 |
| 2017/0127821 A1 | * | 5/2017 | Carter | A47B 21/02 |
| 2017/0251805 A1 | * | 9/2017 | Graham | F16M 11/046 |
| 2017/0360192 A1 | * | 12/2017 | Hu | A47B 9/16 |
| 2018/0332957 A1 | * | 11/2018 | Li | A47B 23/04 |
| 2019/0038015 A1 | | 2/2019 | Huang | A47B 9/02 |
| 2019/0082824 A1 | * | 3/2019 | Matlin | F16M 11/24 |
| 2019/0254420 A1 | * | 8/2019 | Rossini | F16M 11/24 |
| 2020/0375353 A1 | * | 12/2020 | Matlin | A47B 23/043 |

FOREIGN PATENT DOCUMENTS

| | | | | |
|---|---|---|---|---|
| DE | 4424564 A1 | * | 1/1996 | ............. A47B 17/02 |
| DE | 202016106868 U1 | * | 12/2016 | ............... A47B 9/16 |
| GB | 2 269 316 A | | 2/1994 | |
| JP | 3206353 U | * | 9/2016 | ............. A47B 9/02 |
| WO | WO-0049913 A2 | * | 8/2000 | ............. A47B 21/02 |

* cited by examiner

MULTI-POSITIONAL ARTICULATING ERGONOMIC DEVICE WITH MODULAR FEATURES

BACKGROUND OF THE INVENTION

Field of the Invention

The present invention relates to ergonomic office products, more specifically to desktop and tabletop ergonomic assistance devices such as footrests, monitor and laptop risers, writing surfaces, and articulating supports.

Background Art

Ergonomic devices are well known in the current marketplace and are utilized in most offices today to ensure the worker and the equipment the working is interacting with is positioned in a way as to make their daily tasks less strenuous to the muscular skeletal structure of the worker. These types of products typically include numerous and various points of adjustments to ensure they address certain anthropomorphic and biomechanical understandings or standards so as to be deemed an ergonomic device.

An example of such an ergonomic device is a footrest to be used by a seated office worker. A footrest, when properly adjusted allows for a more comfortable position for the user. Typically, a footrest is used under a desk and comes into use when the user is in the seated position. The footrest may include a platform component in which the feet of the user engages with and may also include an underlying mechanism giving the platform its ability to adjust in height and/or its angle position. Such a device as illustrated in FIGS. 2 and 3 of U.S. Pat. No. 4,547,767, is an example of this type of prior art, and shown in FIG. 1 of this application.

FIG. 1 is a prior art patent figure illustration of an exemplary adjustable footrest from U.S. Pat. No. 4,549,767. The upper illustration labeled FIG. 2 upper platform 38 is in the middle position with element 58 resting on middle step element 28. This adjustable footrest exemplifies typical footrests whereas the upper platform adjusts in height and angle.

As workplaces move towards an active workforce model where the worker is encouraged to work while standing or sitting, and to take active breaks to encouraging movement, adds additional need and complexity to the category of ergonomic footrests.

FIGS. 1a and 1b of U.S. Pat. No. 9,961,990 shown in this application as FIG. 2, illustrates a prior art example of a device which provides a footrest when a user is in the standing position while working, and then can be moved away by the operator when the height adjustable table is lowered into the sitting position.

The prior art shown in FIG. 2 is an illustration of an exemplary adjustable footrest as part of a sit stand desk from U.S. Pat. No. 9,961,990. FIG. 1A illustrates footrest element 42 in the retracted position. FIG. 1B shows footrest element 42 in the active position along with the sit stand surface element 50 in the raised position. *interpretation of prior art exemplary figure FIG. 1 of U.S. Pat. No. 6,955,400 shown here as FIG. 3 illustrates an example of a prior art footrest with dynamic movement feature which transmits a sequentially actuated motorized movement to the feet and legs of the user in its attempt to alleviate the effects of being sedentary in an office setting.

FIG. 3 is a prior art patent figure illustration of an exemplary under-desk footrest with motorized movement from U.S. Pat. No. 6,955,400. FIG. 1 illustrates footrest element 1, motor element 5 which moves to articulate armature element 10. Armature element 10 moves footrest element 2 about pivot axis 4. Linkage element 7 allows for alternating articulation of footrest element 3.

Ergonomic writing surfaces are also known to be used to encourage proper writing and working surface angles and have adjustment and features to ensure the desired position and/or angle of the upper surface is in the proper position, in height, laterally, and distance from the user. Typically, a writing surface is used to relieve stress developed from leaning over a flat surface when writing or engaged in a similar activity. The construct of an ergonomic or adjustable writing surface includes a writing surface or platform component and an underlying mechanism giving the platform its ability to adjust in height, laterally, fore and aft, and/or its angle position. A prior art writing surface with some adjustability is disclosed in FIG. 8 of US Patent Application 2004/0256535, included in the present application as FIG. 4, and illustrates the some of the noted features.

FIG. 4 is a prior art patent application figure illustration of an exemplary adjustable writing surface from US Patent Application 2004/0256535 A1. FIG. 8 illustrates writing surface element 400 in its raised position as it is positioned to rest on support element 436.

Laptop stands represent another type of an ergonomic device. These types of devices allow the screen of a laptop to be presented higher so there is less strain due to the reduction of having to tilt one's head forward to view the laptop screen. FIG. 9 of U.S. Pat. No. 7,487,940, shown in this application as FIG. 5, is an illustration of such a device which is designed to allow a laptop computer to be positioned as to accommodate the ergonomically recommended upright viewing angle.

FIG. 5 is a prior art patent figure illustration of an exemplary laptop computer stand from U.S. Pat. No. 7,487,940. Laptop computer retaining element 10 holds laptop computer 20 on upper element 79. Height or angle adjustments are possible through paddle element 47.

SUMMARY OF THE INVENTION

Disclosed herein is a Multi-Positional Articulating Ergonomic Device with Modular Features. The disclosed invention not only overcomes many of the limitations of the prior art, it endeavors to add additional efficiencies for the end user and the manufacturer by using a systems approach. This systems approach allows for core mechanisms to be shared and to interchangeably assembled to create a multitude of ergonomic devices. These devices use similarly design components yet are differentiating enough as to accommodate user variabilities as to qualify as an ergonomic device within the channel or category in which the unit has been modularly configured to sell through.

Due to the numerous and harmful sedentary type office jobs, the need for ergonomically designed devices to counteract these effects has become more prevalent and the market needs have increased. In particular, sit stand devices allowing the worker to raise and lower their primary work surface as to go from sitting to standing. This action is taken into consideration with our disclosed invention in the form of a footrest assembly that has a larger range of motion, is easily adjustable, and includes an activated standing mode while easily returning to sitting mode as to accommodate both sitting and standing positions. Furthermore, the disclosed invention in the footrest assembly has taken into consideration in a unique and inventive manner, the newest trends of active movement which encourages movement even when the user is in the sitting position. With the footrest assembly, active or dynamic movement is encouraged by the core supportive arm mechanism's ability to flex downward when additional pressure is applied beyond the user adjustable neutral setting to accommodate the flexing of the legs and articulation at the ankle joint. These actions are encouraged since the unit's user adjustable settings are not disturbed and the unit will easily return to the user desired preset position each time after the dynamic movement has concluded.

By interchanging the disclosed invention's top platform with another, for example from a footrest platform to a writing surface, the disclosed device can now function in a manner desirable of ergonomic writing surfaces with additional and unique benefits.

Typical writing surfaces have only an angle adjustment and cannot be easily moved out of the way. The disclosed device when configured as a writing surface, the writing surface's angular orientation can be adjusted not just front to back, but angularly due to its ability to pivot and rotate accommodating both right and left-hand/orientations. This additional flexibility allows the surface to sit at a more natural position making it ergonomically superior to standard writing surfaces. Furthermore, the writing surface configuration has the added advantage of being easily moved out of the way when the user is using a keyboard or needing access to the space underneath the writing surface.

Once again, by interchanging the disclosed invention's top platform with another, for example from a writing surface to a laptop and/or monitor riser, the disclosed device can be reconfigured into a monitor or laptop riser. Typical laptop and/or monitor risers have a top platform, or surface which can be adjustably raised, or lowered as to be positioned optimally for viewing the screen. When and if desired, the top platform or surface, on the disclosed device can be raised or lowered, additionally angled forward, or backwards, and pivoted right and left. These additional adjustments allow the user to change viewing angles to match their working position more readily. As well, the feature allows the user to share their monitor or laptop screen with others by rotating the top platform or surface for optimal viewing.

The disclosed invention's main components include, but are not limited to, a base for resting on a surface such as a desk top, a lifting armature mechanism which can be in the form of a parallel or four bar configuration, an optional upper and lower pivoting, and/or rotating assemblies, and an optionally interchangeable top surface/s such as a foot platform, writing surface, monitor support assembly, or laptop support surface, and the unit's support base element/s.

Configurations of the invention may utilize a weighted base to improve the stability of the unit throughout its entire movement range, but in certain configurations when additional stability is required, a securing clamp in addition to, or as an alternative to, the weighted base can be utilized. The base assembly optionally includes within the sub-assembly, a pivoting and/or rotating assembly which is configured add additional movement by utilizing a pivot and/or rotating component which interacts with a bearing surface/s and can incorporate adjustments as to limit the movement range and the force needed to initiate the movement. Additionally, if a return to center feature is desired, this can be implemented by the addition of a biased spring arrangement. The pivot and/or rotating mechanism's force adjustment feature can be factory set using set screws, operator modified by utilizing knurled knobs, and/or relocated to another more accessible location by the use of a cable and actuator assembly.

The aforementioned lift assembly arm can be in the form of a parallel or four bar arm type mechanism, if its desirous to have a support arm, in which the upper attached mount or platform stays relative to its user set or default factory set angle when in the raised, lowered, or positions therebetween; otherwise a dual hinged armature with upper and lower rotational and/or pivoting assemblies would suffice in many of the mentioned configurations, and is typically lower in cost and complexity.

When lift assist is desired, the arm assembly can utilize a positioning assist mechanism in the form of a torsion, extension, or compression spring, or through the use of an expanding gas cylinder, or any other similar or combination of arrangements to impart the force needed for proper assistance when moving the armature throughout its desired range of motion. This assist feature when utilized, can incorporate an adjustment or use a multitude of assists of similar, or varied types which are utilized and actuated in a manner as to ensure the amount of assist force exerted on the armature can be set to a desired level; this is due to the varied needs to ensure the feature meets the user's expectations in each of the varied configurations. The aforementioned manual assist methods can be replaced by a linier actuation motor assembly if a motorized powered version is desired. In addition, the lift arm assembly can be supplemented by the use of a secondary, and/or multiple force assists to aid the primary assist's functional range as to ensure when lifting and lowering the upper mount or platform, the operator is the desired amount of force, whether variable or constant, throughout the range of the armature's movement.

The upper portion of the lift arm assembly is coupled by way of an optional pivoting, and/or rotating assembly which could mirror the construction and feature set of the previously described lower pivoting assembly. Furthermore, either the upper or lower assembly, or both can incorporate a leveling gimble assembly to compensate for any manufacturing, assembly or mounting surface irregularities, can be factory set using set screws, and/or operator modified utilizing knurled knobs. The leveling feature allows the upper mounting plate to stay at its relative set angle position throughout the armature's travel. Both the upper and lower optionally pivoting and/or rotating assemblies may have a force adjustment feature which allow for separately operable and adjustable force settings which when utilized, can regulate the sequential movement of the upper mounting bracket's orientation to the unit's lower base mount assembly.

In some configurations and embodiments, it will be advantageous to make the pivoting, rotational movement assemblies operate unambiguously and/or sequentially. Each of the movement assemblies can be adjusted and set to initiate its motion with a varied force from the other/s, as to eliminate ambiguity, especially in a multi-pivotal and/or multi-rotational configuration. To ensure the primarily desired movement initiates when the optimal amount of force is exerted in the primary movement's actuation direction, the desired resistant setting can be accomplished by adjusting the tensioning assembly on the pivot and rotational retainer collet. By tightening or loosening the tension mechanism, the force needed to rotate or pivot a particular joint assembly, can be tuned by adjustment as to varying the force needed to move the that particular assembly as compared to other assemblies as to make that one pivot/rotational assembly move with lessor or greater force than the another/s.

As an alternative or supplemental feature, an actuation pin, cam, or gear can be added to the pivoting and/or rotating assemblies to adjust the resistance and/or to lock the assemblies. If controlled as a group, the actuated member would be actuated as to interlock the assemblies together, or in the inverse, when the locking pin has not been actuated, the pivoting and/or rotating assemblies would continue to act independent of one another. This actuation of locking and unlocking or of engaging or disengaging a resistive force, would depend on the movement control desired for the product to function as intended in the final assembled configuration. This optional adjustment actuation/s can be accomplished remotely away from the actuation pin, cam or gear, by way of a cable and an actuation lever assembly.

The actuator if utilized, should be advantageously located as to allow the operator to actuate a gas or spring lift assist mechanism. The actuator can be remotely located and activated by way of a lever on one end pulling a cable through the assembly activating the assist mechanism. If using a gas spring, the type that automatically locks in place when the actuator is returned to the non-actuated position is advantageous when a user may want a lock and unlock type positioning device. This allows the working surface platform to be actuated, moved and stopped and be locked in place anywhere within its range of movement. In certain embodiments, it might be advantageous for the armature to not be locked in place as to be in the optimal position when weight is applied (such as in a footrest configuration); this is so when additional force or weight is applied, the upper assembly actively moves and returns as to flex with the user when they are moving, leaning upon, or stretching against the device. In other embodiments of the actuation device, it might be used to unlock and lock a feature such as a rotation feature as to allow the upper platform and/or the lower arm assembly to pivot. Several levers and actuators (more or less) can be used throughout the configuration as to ensure optimal adjustment and feature actuations.

Additionally, the aforementioned rotational and pivotal assemblies, can incorporate an adjustable travel limiter to allow only a portion of its full range of movement to be accessible. The limiter can be preset with some or all of its range of motion being user adjustable. The limiter settings will be determined by the final assembly and which movements would be desirous to limit for a given situation. The adjustment can be created by interchangeable stepped spacers which be engaged separately, as in one at a time or, can be a continuous collet with a protrusion detail which blocks some of the pivotal or rotational range of movement. These limiter assemblies can uniquely incorporate a torsion spring which would assist in the rotation and/or pivotal movements. The torsion spring act as to return the pivot or rotation assembly to the initial default or user chosen position, whereas the pivoted or rotated assembly would naturally return to the spring force center when the operator has released the rotated or pivoted component off the default, or user chosen position—the home position. This back to center feature's home position can be adjusted by rotating the spring pivot assembly to set a newly desired default or home position.

In certain uses, it is advantageous to incorporate an over-drive or clutch mechanism to protect the unit from unintended use. The disclosed invention in the described embodiment includes at least one pivotally and/or rotationally hinged components. The upper and lower assemblies which are attached by way of a pivotally hinged assembly and mounting bracket can incorporate the over-drive mechanism in the lift assisted or non-assisted embodiment, the four-bar parallel arm configuration, or the simpler non-four bar, dual hinged arm configuration. To move the upper assembly up and down without a lift assist, the user would manually position the upper assembly to the desired position and tighten the hinged arm assembly in place. The hinged arm assembly could include detents built into the hinge assembly as to let the user know the arm has been set to a certain position, and each of these detents could be designed in a way as to hold the armature in place (once the user has tightened the hinged and/or pivot mechanism) for normal use, but in the application of high amounts of force or weight, the detents would then work as a clutch and release to the next detent and so on, in such a manner as not to damage the unit's functionality. When incorporating the clutch mechanism within an embodiment which incorporates a four-bar mechanism with a lift assist, the clutch mechanism will take into consideration the application of force or weight above the recommended specified limit; when this force limit is reached, the lift assist will give way as to allow movement of the armature as to not damage the unit's functionality.

The disclosed invention has distinct unique features such as dynamic movement, adjustability, flexibility, and modularity and are the key characteristics of the core mechanism which support an optionally interchangeable and varied top surfaces, which when assemble upon the optionally varied number of support bases, create varied and unique user experiences. Along with these demonstrable functional advantages, we are disclosing a method and system in which, a manufacturer, and/or distributor, and/or consumer can construct a multitude of ergonomically based products effectively and at lower cost than if they were to, design, engineer, tool, manufacture, assembled and ship each of the varied constructs individually. The manufacturer and distributor can mass ship the components and/or construct the desired product as ordered by the consumer to save shipping, warehousing cost while responding to the consumer's needs in a build to order premium service at much lower costs and investment.

As of note, these disclosed configurations and embodiments are by no means an exhaustive list of the multitude of configurations and variations producible by the disclosed application but is meant to be illustrative to demonstrate the advantageous ergonomic flexibility of the disclosed invention and its sub-components and sub features.

The listed products features and inventive embodiments as described in this application should not be considered as limiting in any way. The disclosed features and inventive embodiments of this application can be applied to a range of products which are Multi-Positional Articulating Ergonomic Devices.

In one form, the invention is directed to a support device for selectively elevating a platform above a working surface. The device includes: a base for resting on a work surface; an articulating armature assembly; and a platform assembly. The base is coupled to the articulating armature assembly. The articulating armature assembly is coupled to the platform assembly. The articulating armature assembly has a range of elevation to selectively raise and lower the platform assembly above the working surface. The elevation is selected by the user through an articulation actuator that includes a spring.

In one form, the articulation actuator includes an actuation lever to selectively engage the spring.

In one form, the spring provides a counterforce to a downward force on the platform assembly when the articulating armature assembly is in an upper range of elevation.

In one form, the device further includes a second spring with a force higher than the first spring.

In one form, the first spring provides force to the articulating armature assembly in a first range of elevation. The second spring provides force to the articulating armature assembly in a second range of elevation.

In one form, a first actuation lever selectively engages the first spring. A second lever selectively engages the second spring.

In one form, the device further includes a range controller. The range controller defines the range in which the articulating armature assembly moves.

In one form, the spring provides counterforce to a downward force on the platform assembly, when the armature assembly moves within the range defined by the range controller.

In one form, the invention is directed to a support device for elevating a platform above a work surface. The device includes: a base; an articulating armature assembly; and a platform assembly. The base is coupled to the articulating armature assembly. The articulating armature assembly is coupled to the platform assembly. The articulating armature assembly has a range of elevation above the base. A spring is engaged with the articulating armature assembly to provide a counterforce to a downward force on the platform assembly.

In one form, the spring engages with a range controller to limit the range of elevation.

In one form, the counterforce supplied by the spring is selectively engaged by an actuation lever.

In one form, the device further includes a slide plate on the bottom of the base. The slide plate is selectively in contact with a surface upon which the base rests when the base is tilted by the user. The slide plate is not in contact with the surface when the base is not tilted.

In one form, the device further includes a second spring to provide a counterforce to a downward force on the platform assembly. The second spring applies its downward force when the articulating armature assembly is in a second range of elevation above the base.

In one form, the second range of elevation is limited by a second range controller.

In one form, the device includes a rotational bearing that allows the articulating armature assembly to rotate with respect to the base.

In one form, the articulating armature assembly is a four bar assembly.

In one form, the invention is directed to a support device for elevating a platform above a working surface. The device includes: a base assembly for resting on the working surface; an articulating armature assembly coupled to the base assembly; and a platform assembly coupled to the articulating armature assembly. The articulating armature assembly has a range of elevation positions. A biasing member is engaged with the articulating armature assembly. The biasing member provides a counterforce against a downward force on the platform assembly when the articulating armature assembly is at an elevation higher than a lower elevation position. A range controller is engaged with the biasing member to limit the range of elevation positions in which the biasing member applies the counterforce.

In one form, the biasing member is a gas strut.

In one form, the support device further includes the articulating armature assembly having a second range of elevation position higher than the first range. A second biasing member engages the articulating armature assembly and provides a second counterforce against the downward force on the platform assembly. A second range controller engages with the biasing member to limit the second range of elevation positions in which the biasing member applies the second counterforce.

In one form, further includes a TPU grommet between the base assembly and the articulating armature assembly.

DETAILED DESCRIPTION OF THE PREFERRED EMBODIMENT

Figure 1:
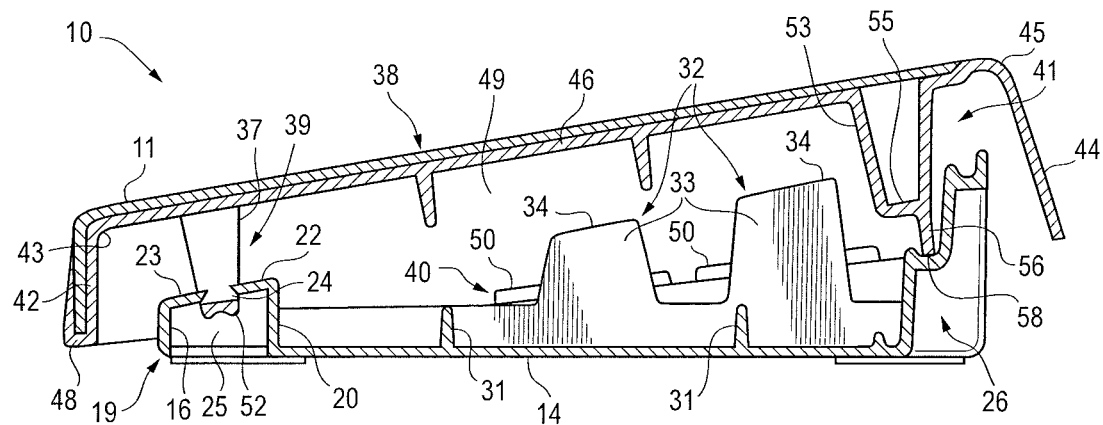
FIG. 1 is a prior art patent figure illustration of an exemplary adjustable footrest.
Figure 1:
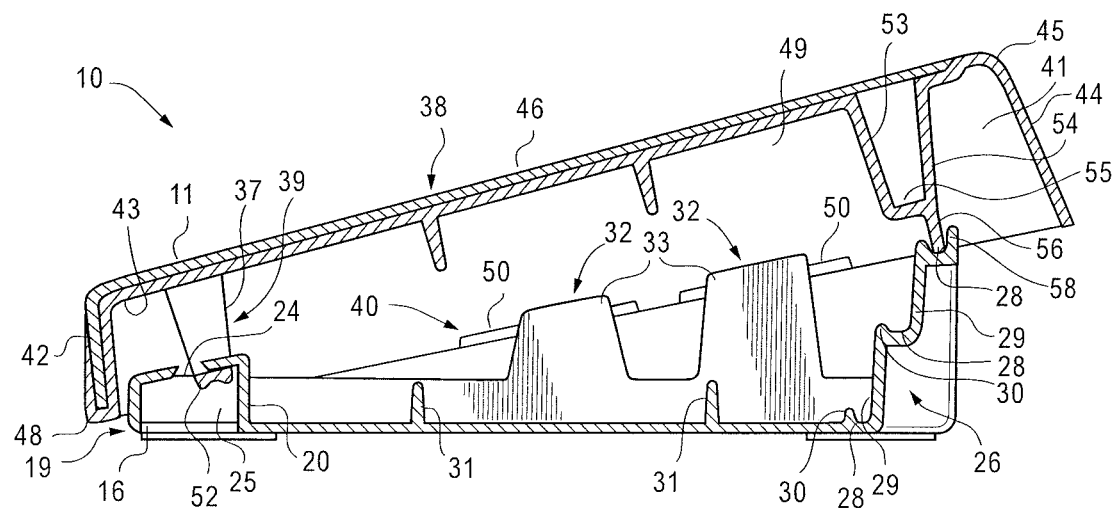
Figure 2:
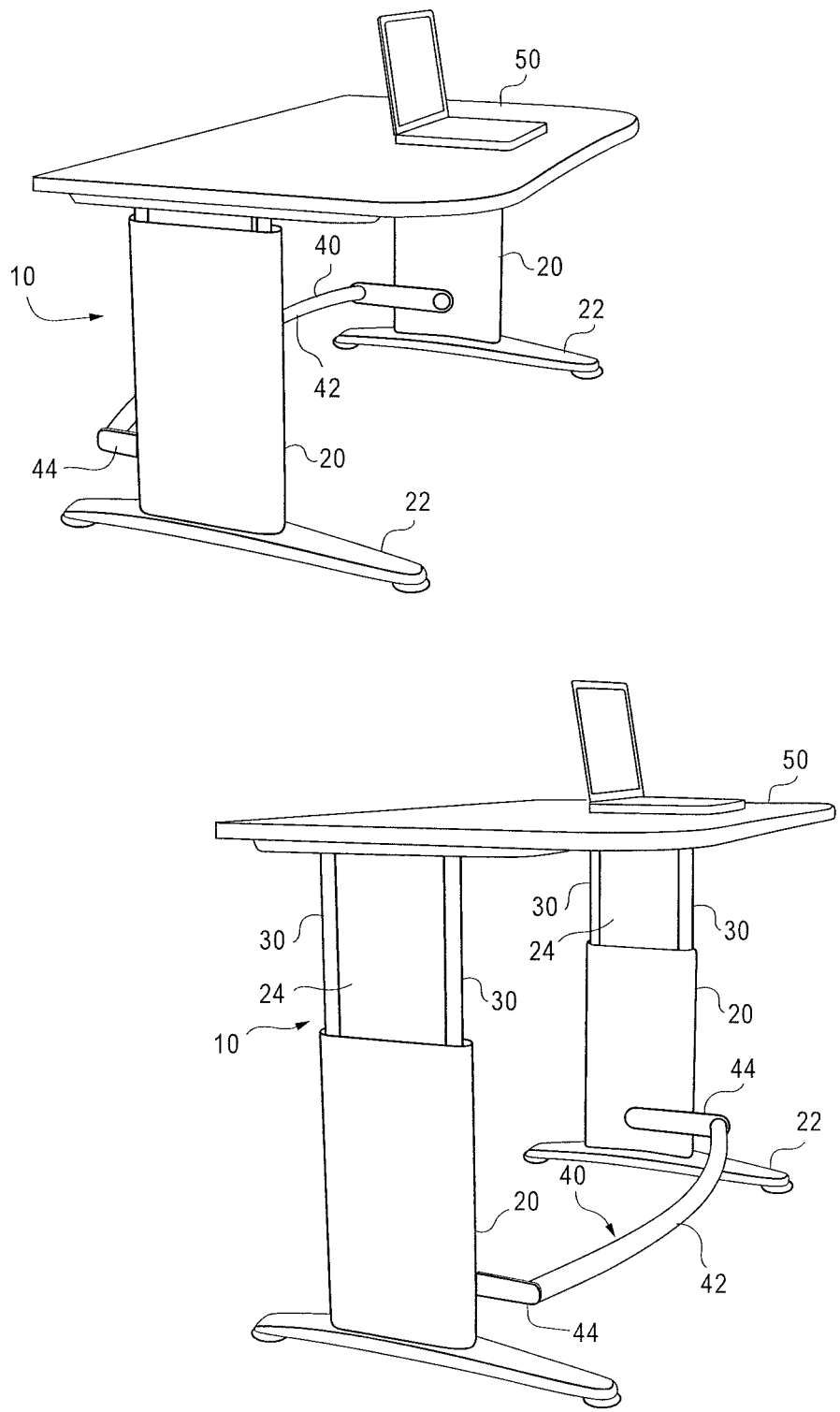
FIG. 2 is a prior art patent figure illustration of an exemplary adjustable footrest as part of a sit stand desk.
Figure 3:
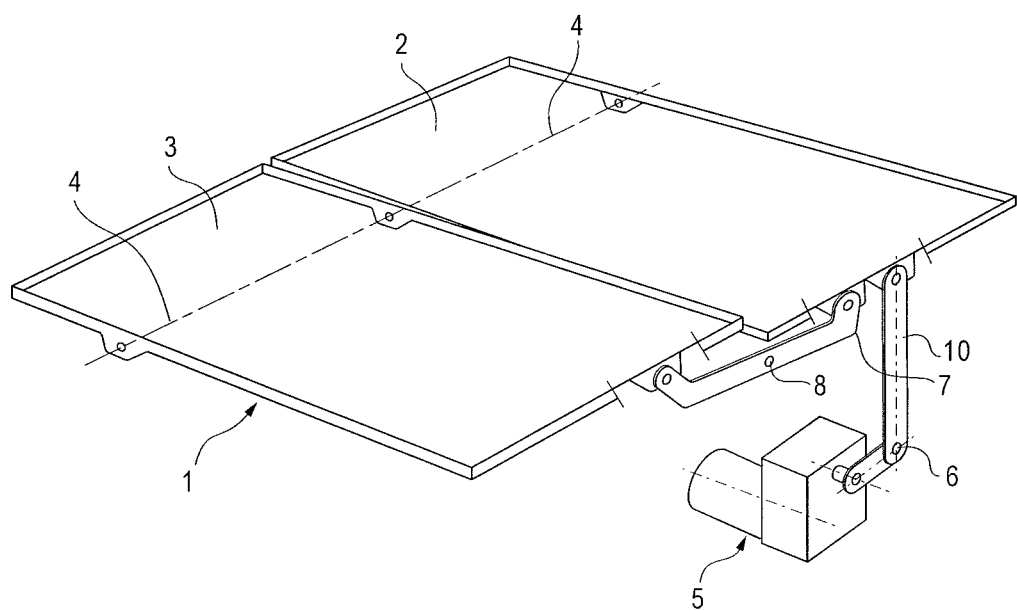
FIG. 3 is a prior art patent figure illustration of an exemplary under-desk footrest with motorized movement.
Figure 4:
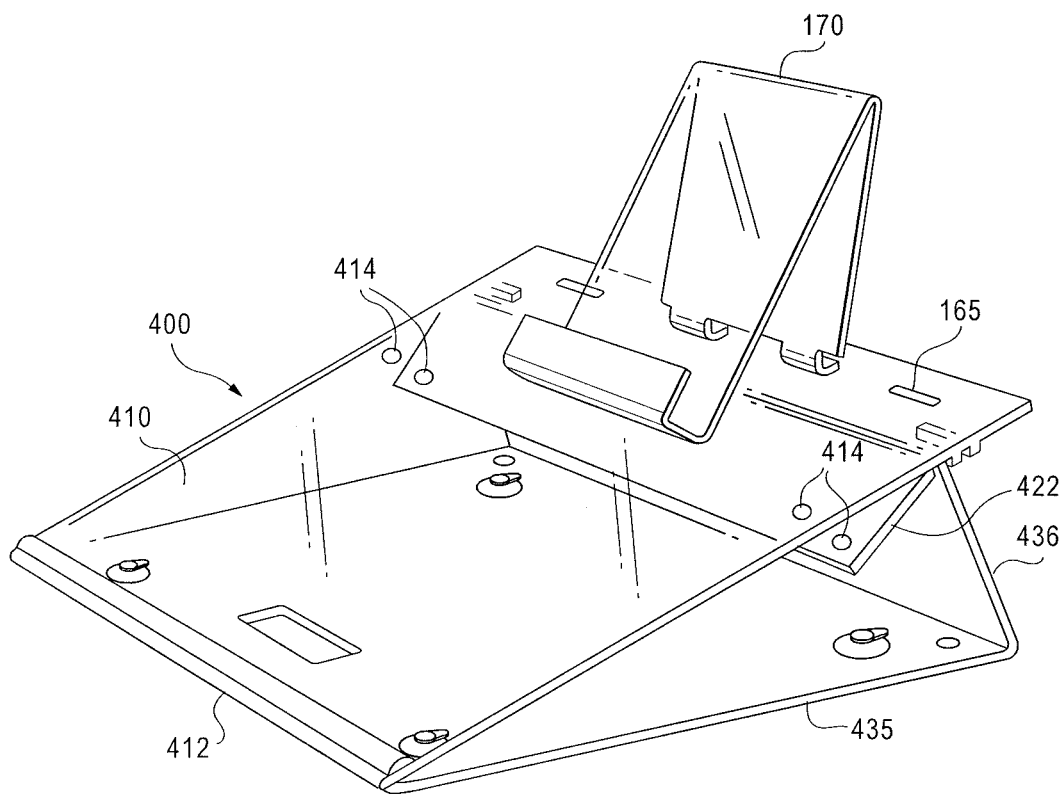
FIG. 4 is a prior art patent application figure illustration of an exemplary adjustable writing surface.
Figure 5:
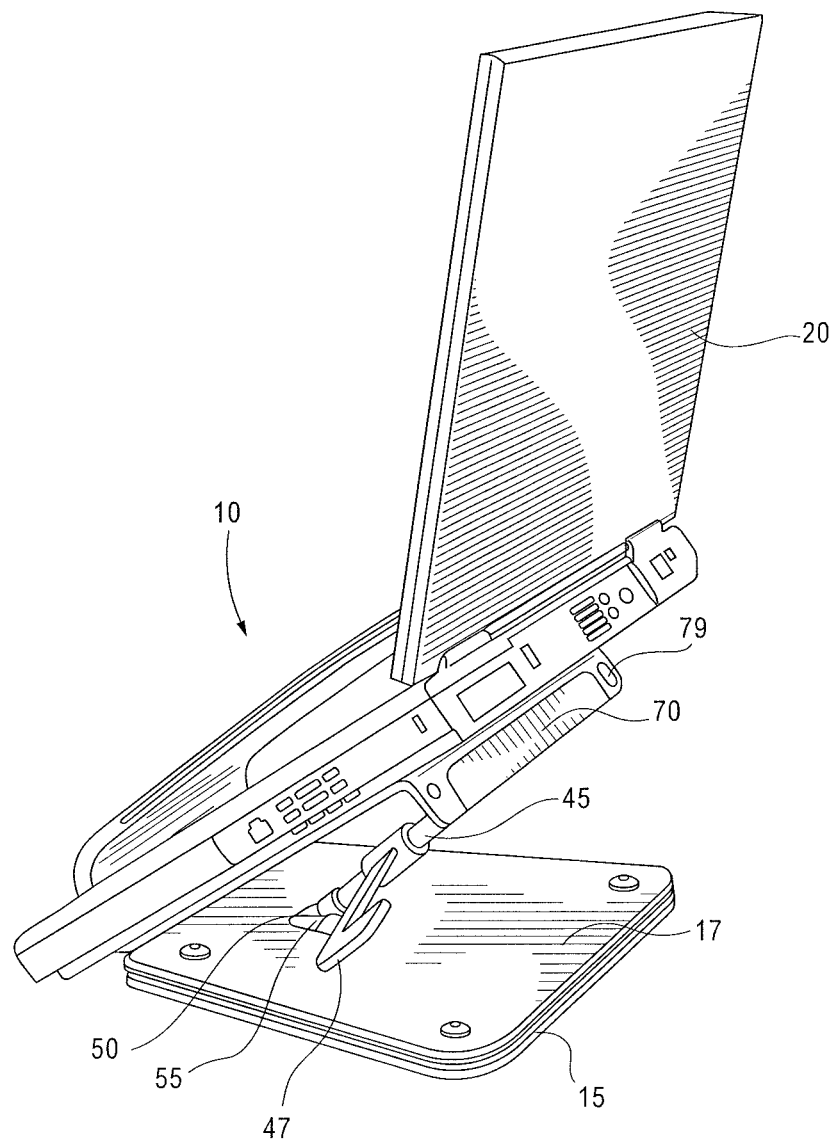
FIG. 5 is a prior art patent figure illustration of an exemplary laptop computer stand.
Figure 6:
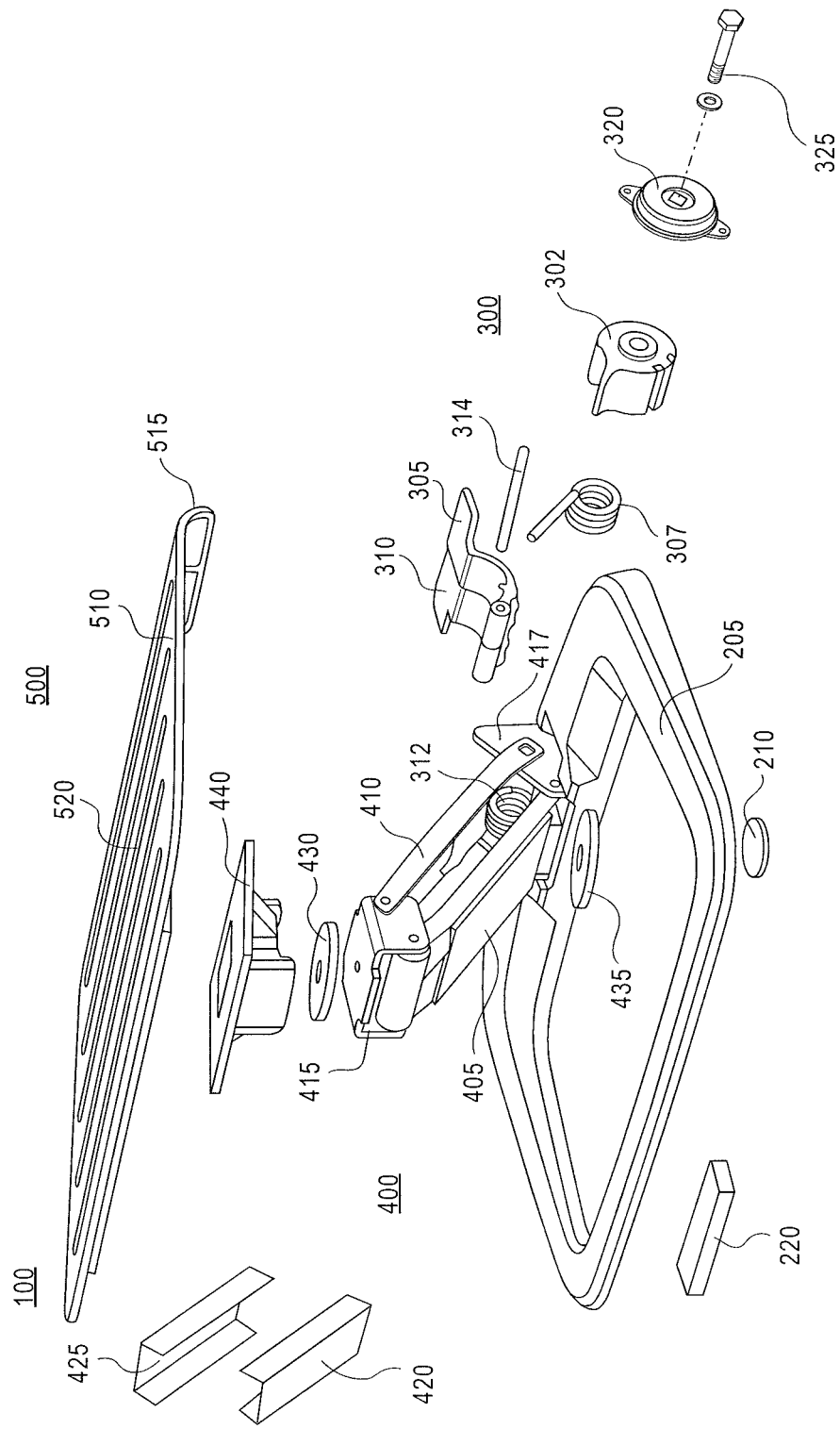
FIG. 6 is a rear perspective exploded view of the Multi-Positional Articulating Ergonomic Device with Modular Features of the present invention.

With reference to the figures, the various details and embodiments of the invention are shown. One skilled in the art will recognize that due to the modular nature of the assemblies described herein, many of the details may be applied to other embodiments even though they are discussed with reference to a specific embodiment. FIG. 6 is a three-quarters exploded view of the Multi-Positional Articulating Ergonomic Device with Modular Features of the present invention. The device 100 is shown with footrest platform assembly 500 which includes platform 510, gripping components 520, and curved front kickplate 515. The platform assembly 500 may include a TPU grommet in coupling to the articulating armature assembly 400 to allow for some movement, deflection and adjustment of the platform 510 relative to the armature assembly for the comfort of the user.

In some embodiments, the platform assembly 500 is supported by the articulating armature assembly 400 which includes upper connection plate 440, optional upper rotational bearing 430 (when rotation and pivoting movement is desired) which is assembled to upper four-bar connection plate 415 which links upper four-bar arm 410, lower four-bar arm 405 and lower four-bar connection plate 417 creating the articulating four-bar mechanism.

The four-bar mechanism is optionally encased by upper encasement 425 and lower encasement 420. The four-bar mechanism assembly is then coupled to the base assembly 200 by way of the optional lower rotational bearing 435 (when additional rotation and pivoting movement is desired) which if not utilized, the base assembly 200 would then attach to the armature assembly by way of the lower four-bar connection plate 330 only.

The lower four-bar connection plate also contains an armature articulation actuator assembly 300 consisting of a high force spring or other biasing element such as torsion spring 312, and a lower force spring or biasing element such as torsion spring 307, the springs allow for differentiating forces in the articulation range of the four-bar armature's movement ranges. In embodiments where a differentiating force is not desired, a single spring element can be utilized in place of the multiple elements shown.

To initiate movement of the armature, an actuation lever is provided which would release the spring and engage the spring accordingly. In this embodiment, the two spring element's actuations are controlled by actuation lever 305 and 310 accordingly which are retained in lower four-bar connection plate 417 by way of retaining pin 314. Optionally, if stops or ranges of upward articulation of the four-bar mechanism is desirous, rotational range controller 302 can be utilized to ensure the user needs to re-actuate the springs as to control the sub-range of motions within the articulation movement of the four-bar assembly. Rotation damper 360, range controller 302 and torsion springs 307 and 312 can be assembled by machine screw and washer 325 to slow the expansion of the spring elements by way of an internal assembly of plates and damper grease within damper 360 to slow down the upwards movement of the four-bar assembly 400 and the attached upper platform assembly 500.

In some embodiments, the base assembly 200 includes a base unit 205, gripping elements 210 of which there can be a plurality placed on the underside of base unit 205. Optional slide plate 220 is also attached to the underside of base unit 205 allowing the unit to be moved easily by lifting the unit by the kickplate 515 and pivoting or tilting the unit on the slide plate 220, allowing slide plate 220 to make primary contact with the floor or other working surface to easily move the unit until lowered as to then allow gripping elements 210 to make primary contact with the floor securing the unit from nonintentional movement.

Figure 7:
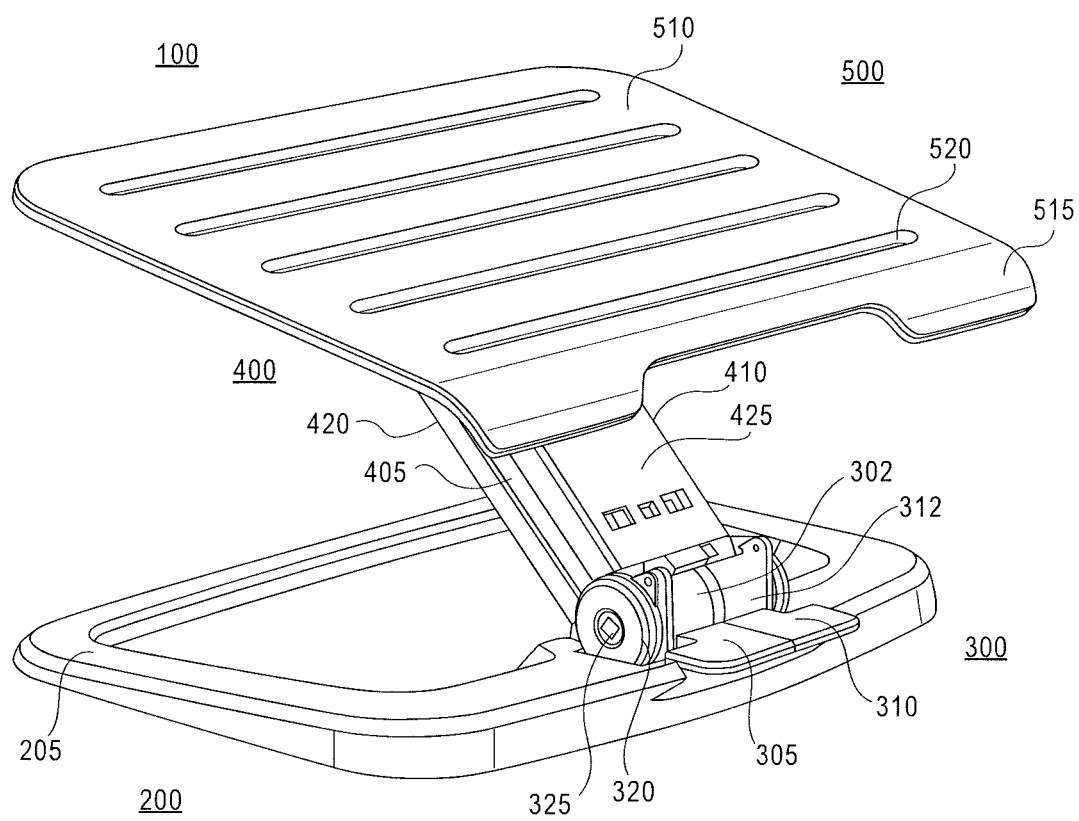
FIG. 7 is a front or operator's point of view perspective view of the Multi-Positional Articulating Ergonomic Device with Modular Features of the present invention.

In some embodiments as shown in FIG. 7, the device 100 is shown with footrest assembly 500 moveably coupled onto the articulating armature 400. Raising and lowering of the unit is controlled by actuation assembly 300, which includes machine screw 325 which allows the articulating armature 400 to be moveably attached to base assembly 200.

The actuation assembly 300 allows for a multitude of movement ranges which allows for example, a sitting range and a standing range. Between those set ranges, platform 510 can be moved with a downward force allowing the counter sprung articulating armature 400 to counter the force; this action allows and encourages the operator's legs to stretch, feet and ankles to move without having to constantly readjust the foot rest's height or spring tension. If too much force is exerted onto the armature 400 or footrest platform 510, actuation assembly 300 has a clutching safety feature to discourage using the footrest as a step.

Figure 8:
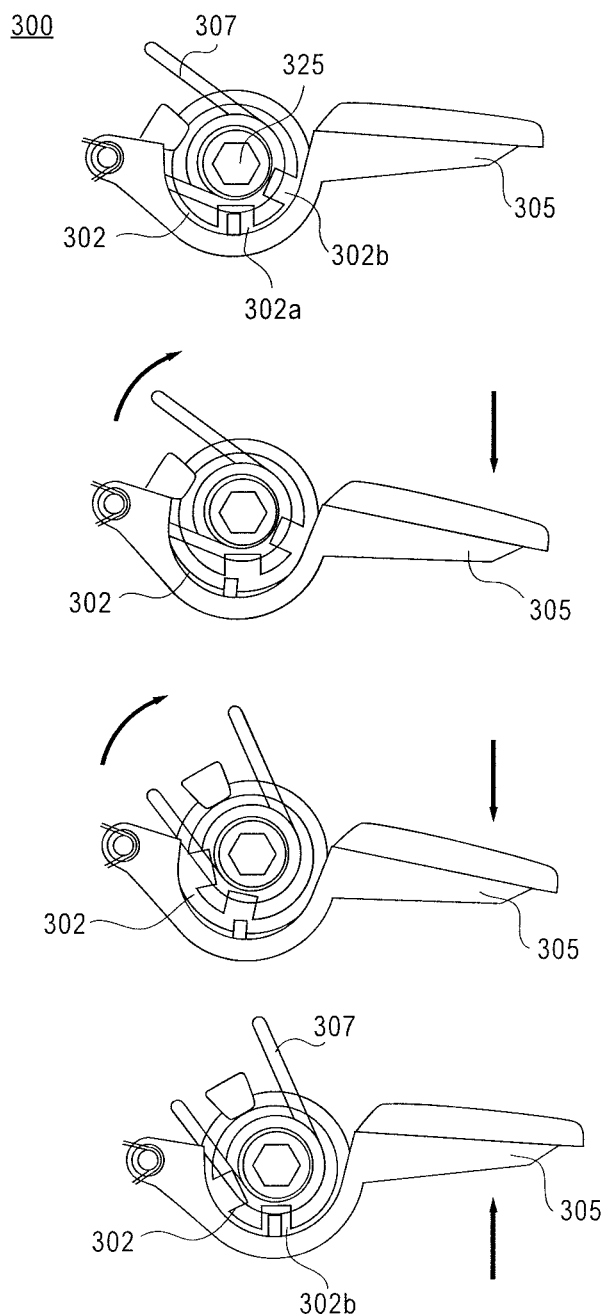
FIG. 8 is a series of sequential isometric side views of four diagrams of an actuation assembly sequentially illustrating how a rotational range controller functions.

FIG. 8 a simplified isometric side view of four figures of actuation assembly 300 sequentially illustrating how rotational range controller 302 functions. The top figure in the sequence of figures represents the assembly as it would be in the lowered position of two positions as represented in this embodiment; range controller 302 position notch 302a is engaged with actuation lever 305. Torsion spring 307 provides for additional range of motion within this position while exerting a counterforce when a rotational force is enacted on the rotational range controller.

In the next following sequential figure, actuation lever 305 is depressed, disengaging the actuation lever retainer detail from position notch 302a. In the next following sequentially lower figure, rotational range controller 302 has been rotated clockwise, placing position notch 302b above the retainer detail of actuation lever 305. In the next following sequential and lowest figure, position notch 302b is fully engaged and actuation lever 305 is returned to its raised non-depressed position. In this position, the assembly would be in the higher of the two positions with torsion spring 307 providing for additional range of motion within this position while exerting a counterforce when a rotational force is enacted on the rotational range controller.

This embodiment illustrates how the actuation assembly 300 with the range controller 302 actuates and controls the lower zone of movement of the device 100 as well as provide actuation and control in the upper ranges of movement as well. Even though in this embodiment, only two ranges are shown, additional positional notches could be implemented or removed to provide an assembly, such as an articulating support arm with multitudes of positions, ranges of movement with and without force feedback within those positions. One will recognize that there may be multiple ranges of motion, and that each range may be limited or defined by a separate range controller or range controller mechanism. For instance, if the embodiment were to have three ranges of elevation, each range may have its own range controller and may have its own spring, gas strut, or other biasing member and respective actuator to selectively provide counterforce.

Figure 9A:
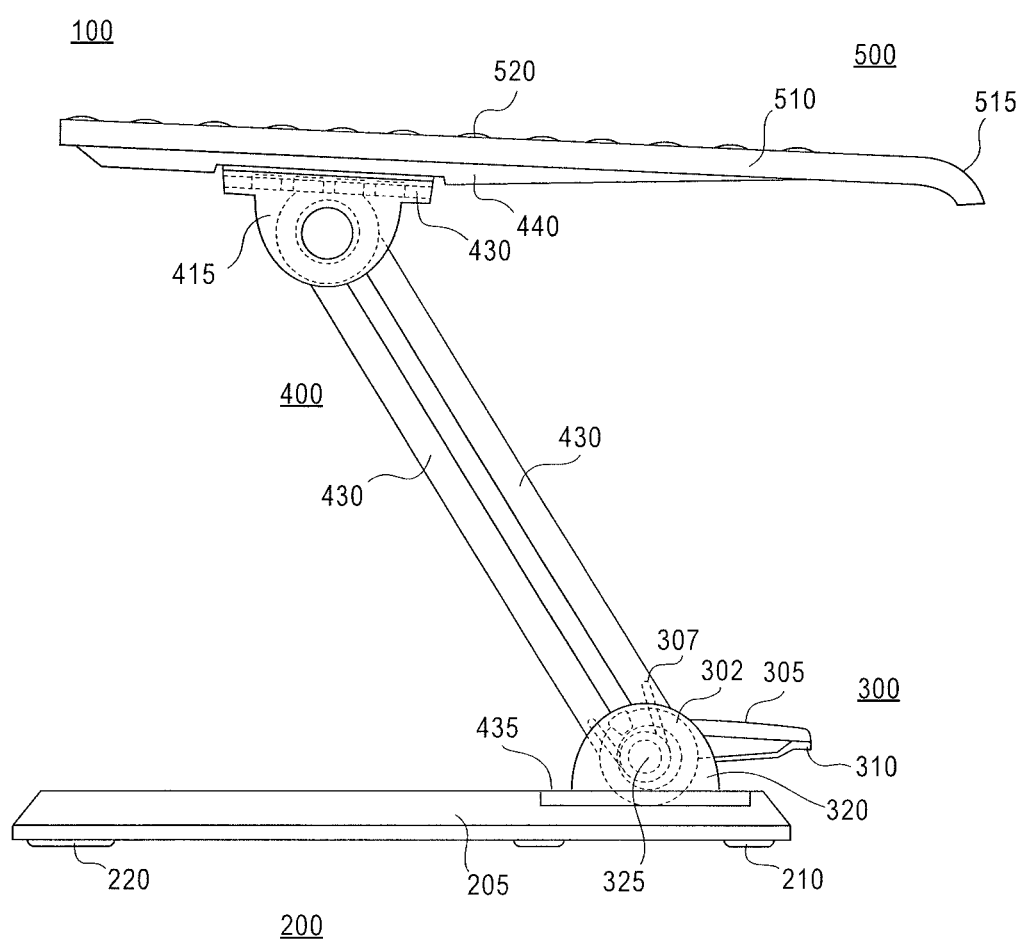
FIG. 9A is a simplified isometric side view showing a footrest embodiment of the present invention in its upper range of movement.
Figure 9B:
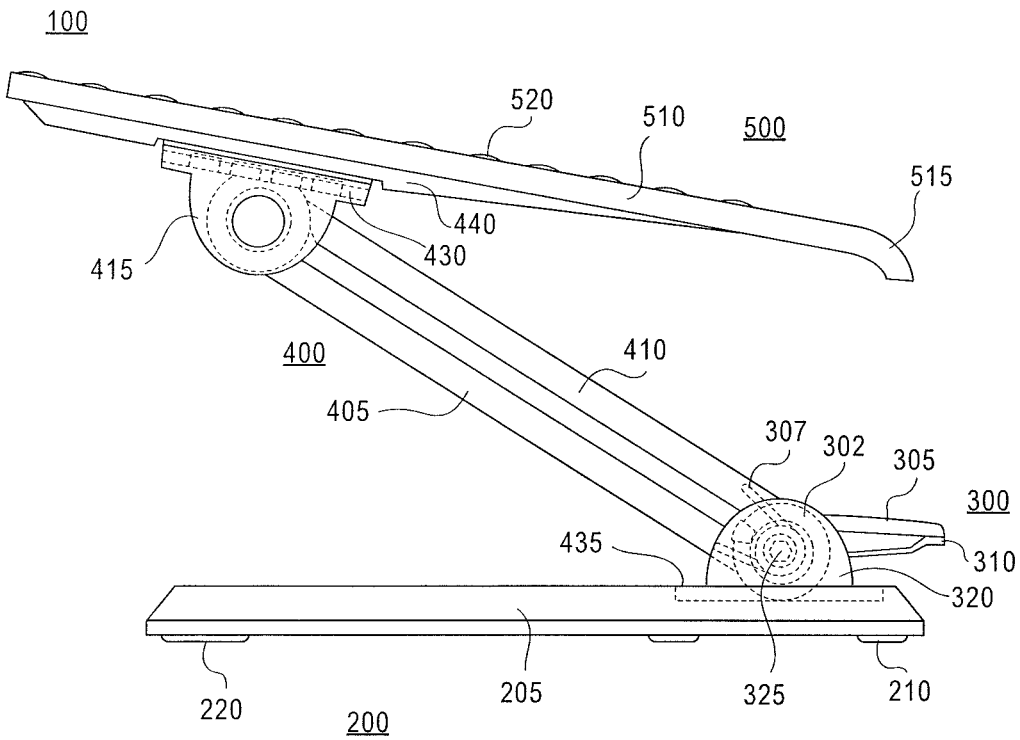
FIG. 9B is a simplified isometric side view showing a footrest embodiment of the present invention in an optional range of movement and the force feedback feature.

An exemplary upper range of movement for a footrest embodiment is shown in FIG. 9A and a lower range of movement is shown in FIG. 9B. This illustrates the optional range of movement and the force feedback feature within an upper movement range setting. For example, an operator would be in a standing position with one foot resting on the upper side of platform assembly 500. FIG. 9A represents the unit with little or no force or weight applied in the upper movement range setting. As weight is applied to footrest platform 510, upper armature 410 exerts force upon torsion spring 307 which acts as a counterforce to the applied force or weight. This counterforce allows the operator to interact with the footrest as to engage with the unit further by applying additional weight and/or additional force; these additional forces engage the torsion spring by way of the articulation armature 400 rotating the torsion spring further into its range of motion and when the additional forces disengage, counter rotating the torsion spring in response to the lessening weight or force. These actions allow platform 510 to stay engaged with the operator and move in direct response operator's actions in a way as to support not only the natural weight exerted onto the unit, but the additional forces exerted by the operator as to give way (platform 500 lowers) while pushing back (upwards) with a countering force by way of the articulating armature 400 and actuation assembly 300's torsion spring 307. This giving way and counterforce is intended to allow the operator to engage with the footrest platform 510 using more natural movements which stimulates the operator's joints and muscles versus a device which is more stagnant and rigid in form. While this example has the operator standing, the same action utilized while sitting as well. Further, the footrest may be used to allow a user to have a surface on which to place her feet, for example when sitting in a raised chair, or those whom need the higher setting for proper ergonomic positioning, or those whom want to interact with the footrest in a more active way.

Figure 10A:
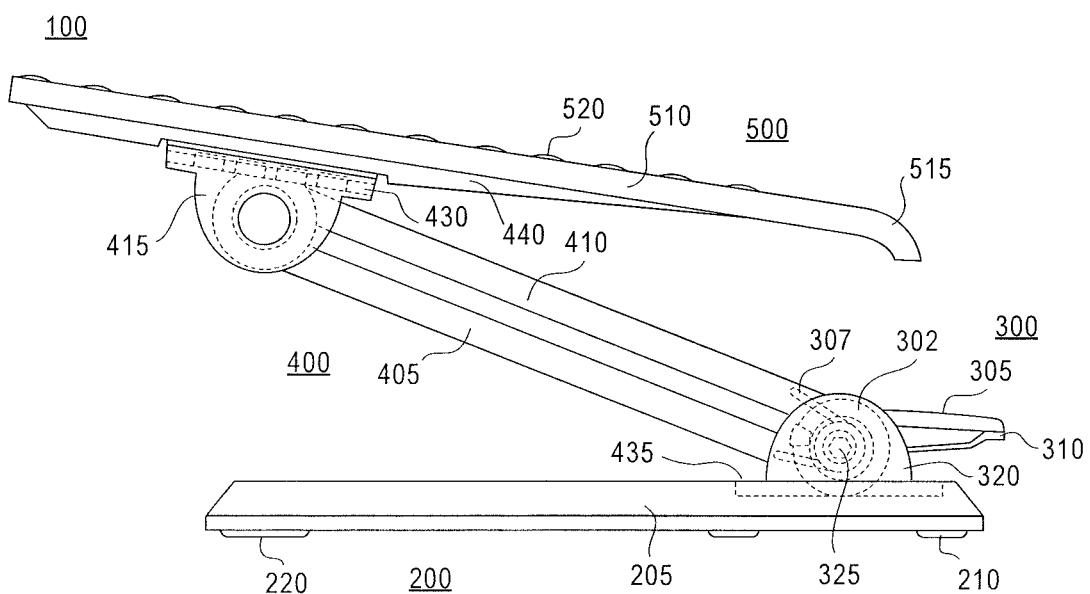
FIG. 10A is a simplified isometric side view showing the invention in the footrest embodiment in a lower movement range setting position, illustrating the optional range of movement and the force feedback feature.
Figure 10B:
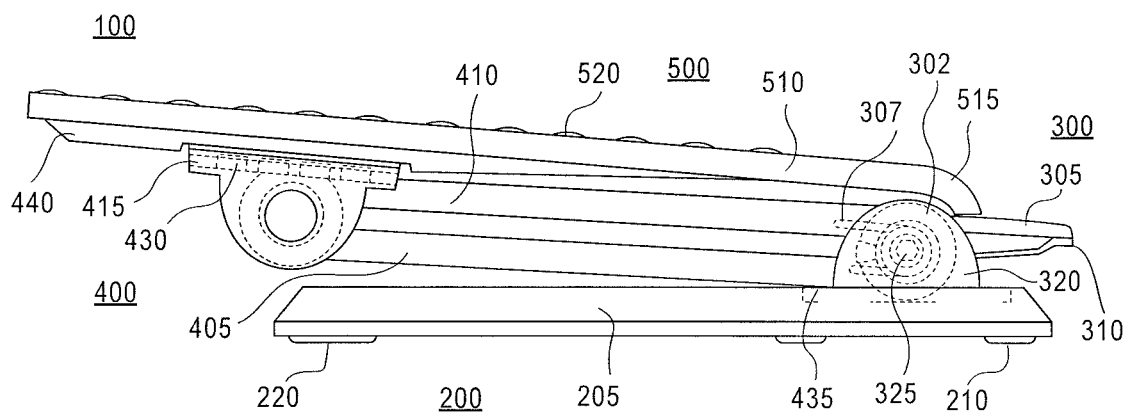
FIG. 10B is a simplified isometric side view showing the invention in the footrest embodiment in a lowest movement range setting position, illustrating the optional range of movement and the force feedback feature.

FIGS. 10A and 10B illustrate the invention in the footrest embodiment in the lower movement range setting position, illustrating the optional range of movement and the force feedback feature within that lower position setting. This lower position setting is representative of the invention in the embodiment of a footrest which is being used in the sitting position or a lower setting range for a standing position. Whereas the operator would be sitting in an office chair with either one or both feet resting on the upper surface of platform assembly 500 or may be standing with one foot resting on the platform in its lower movement range setting.

Figure 11:
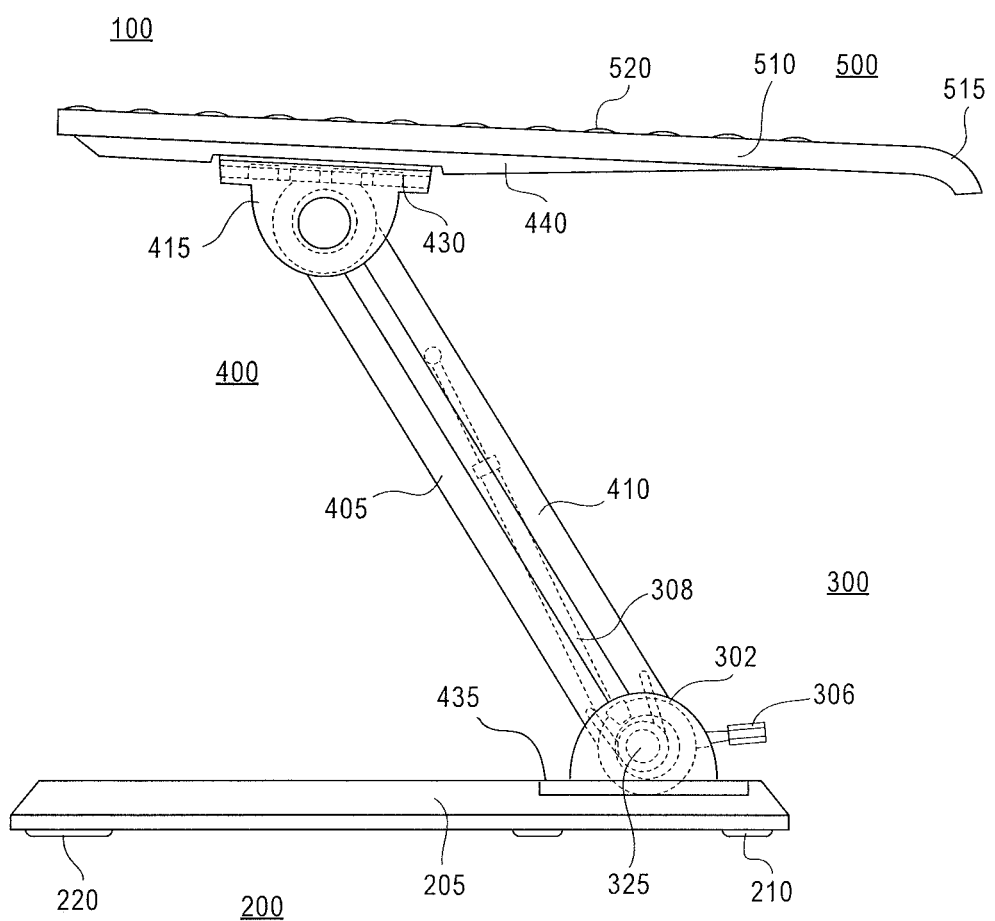
FIG. 11 is a simplified isometric side view, showing the invention in the footrest embodiment in the upper movement range setting position, illustrating the alternative use of a gas spring.

In some embodiments as shown in FIG. 11 the invention may in the alternative use a gas spring 308 moveably attached to upper four bar arm 410 and lower connection plate 417, in place of the torsion spring arrangement previously disclosed. The actuation assembly 300 includes actuator 306 which actuates the lowering and raising of the unit by depressing the gas spring's valve mechanism allowing the gas spring's 308 telescoping member to extended in the raising mode or be contracted in a lowering mode. This actuator 306 may include a force adjustment screw which adjusts the force exerted by gas spring 308 to ensure the proper countering force is exerted as to ensure the units functionality, which in this case, is the footrest embodiment. In other embodiments, the force setting required might be less or greater depending on how the unit is configured and how much force or weight is applied to the gas spring.

Figure 12A:
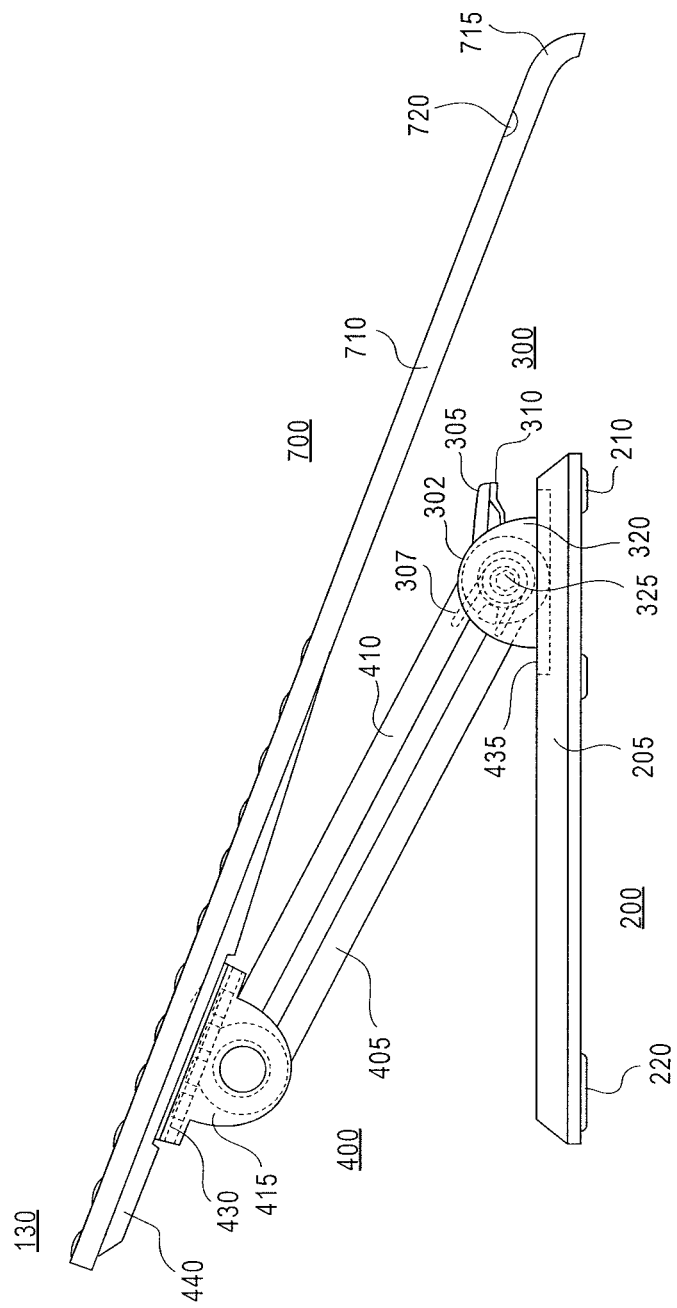
FIG. 12A is a simplified isometric side view showing the invention in the writing surface embodiment in a raised position.
Figure 12B:
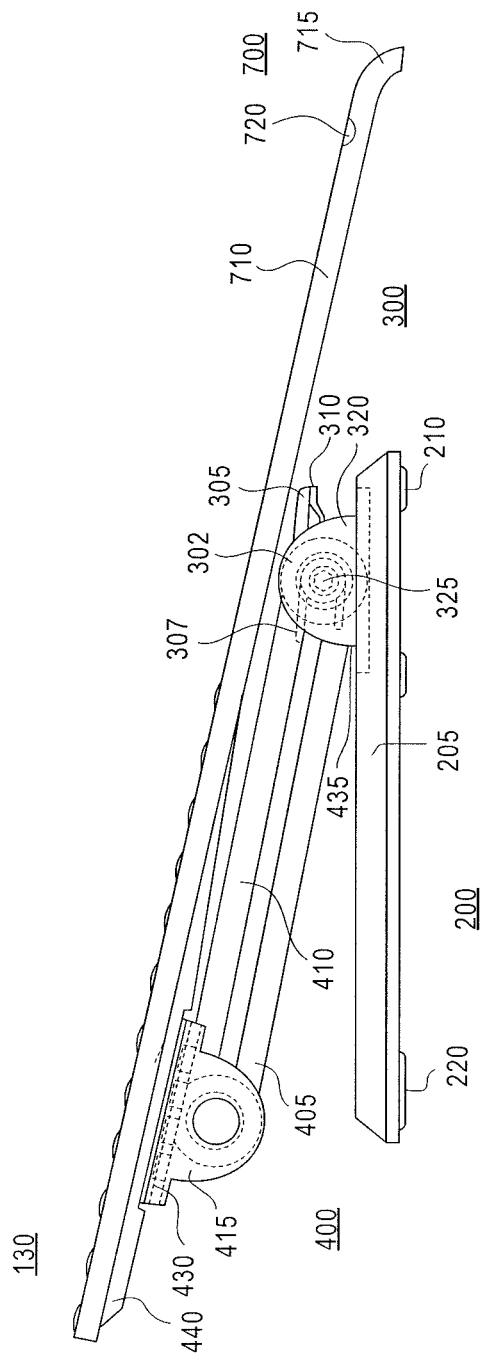
FIG. 12B is a simplified isometric side view showing the invention in the writing surface embodiment.

In some embodiments the device may include a writing surface as illustrated in FIGS. 12A and 12B. FIGS. 12A and 12B illustrate the invention in the writing surface embodiment in the raised and lowered configuration respectively. FIGS. 12A and 12B show the commonly shared base assembly 200, armature actuation assembly 300 with the articulating armature assembly 400 is in a raised position. This raised position allows writing surface 700 to be at a greater slope as compared to the surface in which the unit rests.

In some embodiments writing surface 700 can be pivoted in the plane of the writing surface 700 by way of upper and or lower rotational bearing 430 and 435 respectively. Typical writing surfaces do not have the ability to rotate as to accommodate right-hand or left-hand orientation thus making this configuration much more conducive to answering the ergonomic needs of such a device.

Writing surface 700 is shown with writing instrument holder 720 and resting edge 715 which is sloped as to accommodate a transition for the wrist and a contact point as to ensure stability if one would lean against the surface. FIG. 12B represents the writing surface embodiment in the lowered configuration, whereas actuation lever 305 has been utilized to allow the unit's writing surface 700 to reside lower and therefor at a less angle as compared to the surface the unit is resting upon.

FIGS. 13A-F illustrate embodiments of the invention in a monitor arm embodiment in the raised and lowered configuration along with a more detailed view of an optional sliding connector. Modular monitor arm assembly 700 is coupled to articulating armature 720 which is coupled to connection plate 440 and to the rest of the unit, including articulating armature assembly 400, actuator assembly 300 and base assembly 200 allowing for a monitor arm configuration to rest upon a surface in this configuration. In other configurations base assembly 200 can be replaced by a desk or table clamp system if desirous.

Armature 720 can be constructed similarly to articulating armature assembly 400 using an articulating four-bar mechanism or can be of a simpler construct of being slidably attached to upper connection plate 440 as to allow monitor 750 to move away from and towards the operator. Along with the optional slidable attachment means, articulating connection plate 415 and monitor connection plate 710 allow for pivotal and optionally rotational movement. The pivotal articulating connection plate allow the monitors viewable area to be articulated in an upwards, downward, in and out, as well as pivotal movements.

Figure 13A:
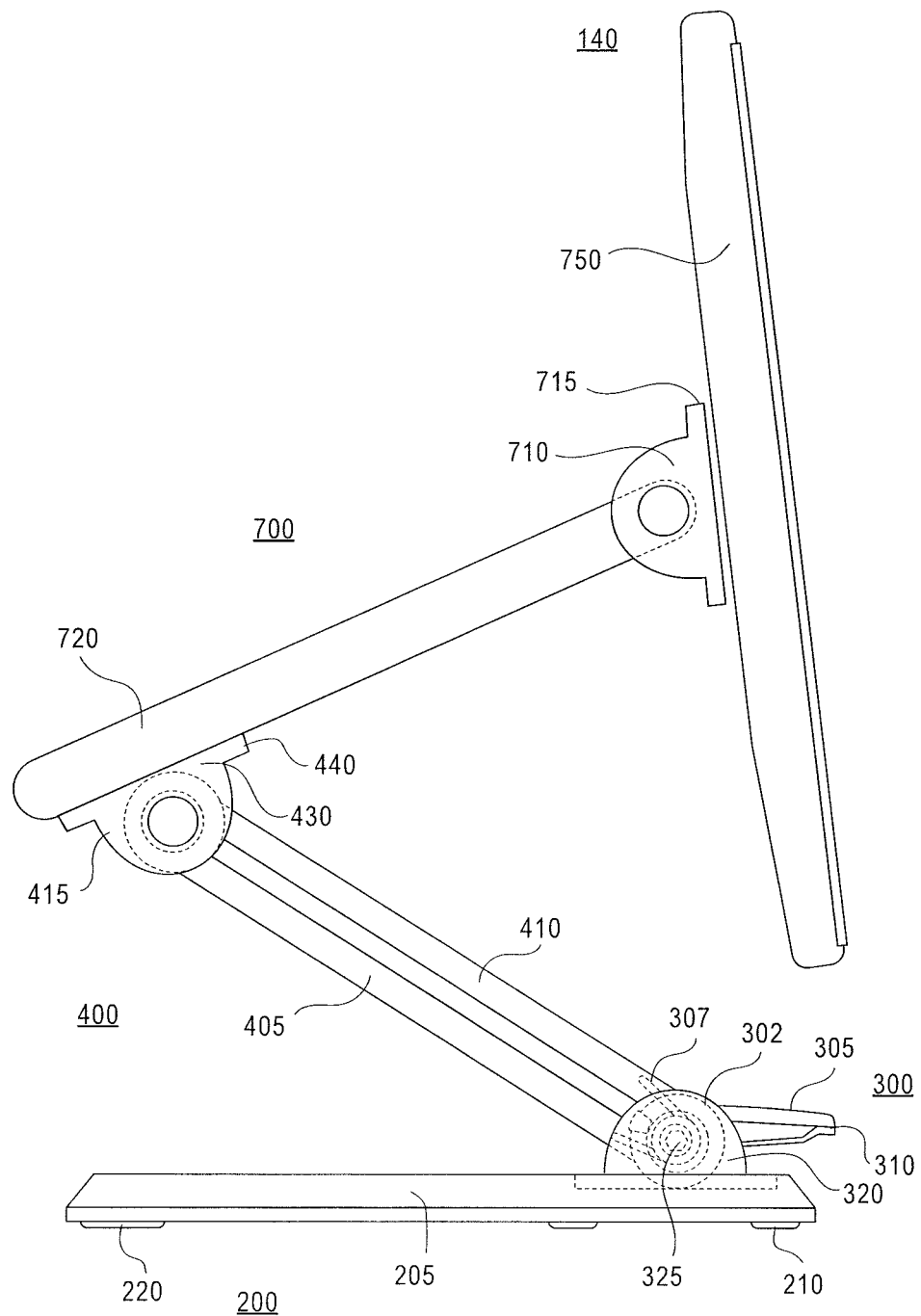
FIG. 13A is a simplified isometric side view showing the invention in the monitor arm embodiment in a lowered configuration.
Figure 13B:
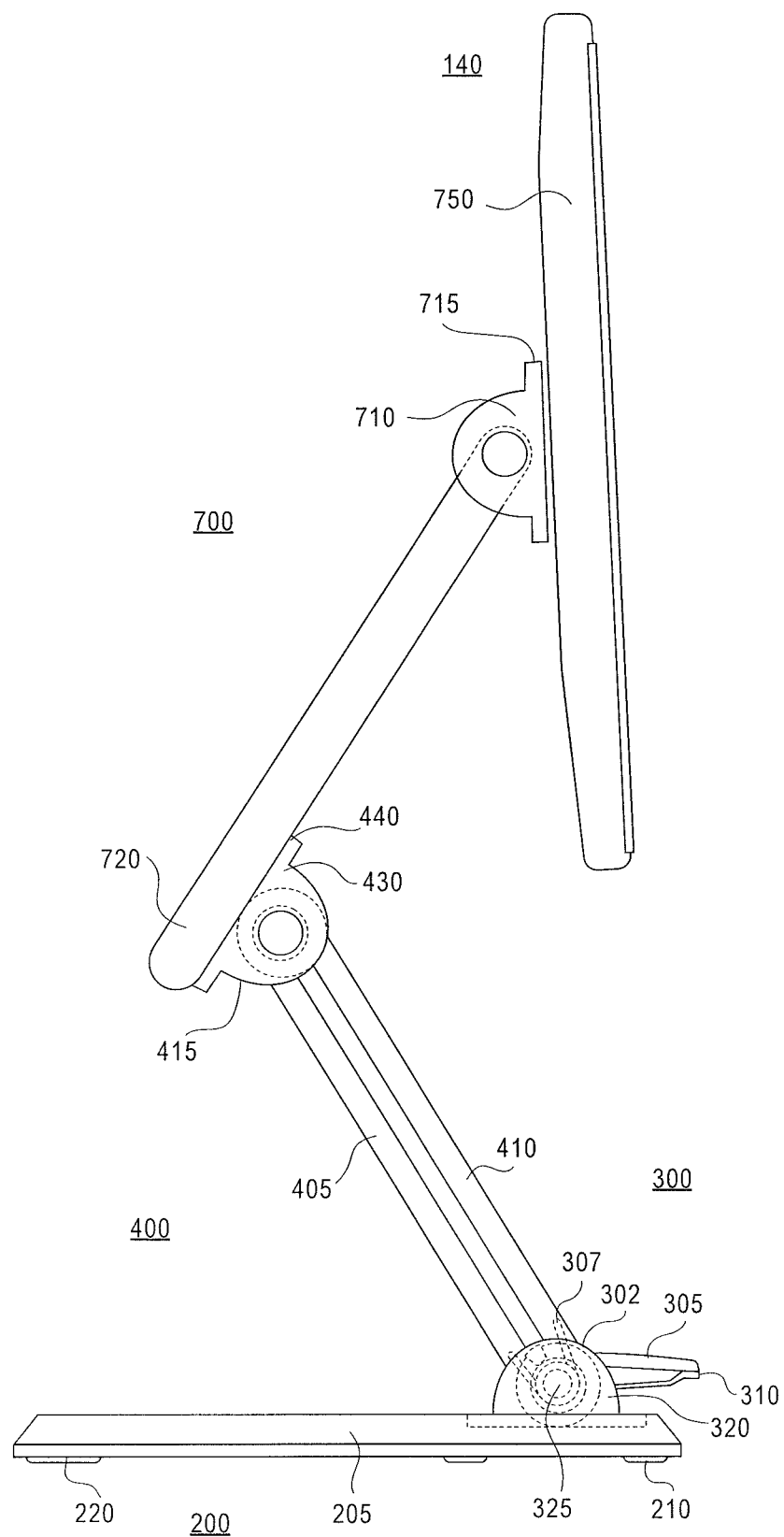
FIG. 13B is a simplified isometric side view showing the invention in the monitor arm embodiment in a raised configuration.
Figure 13C:
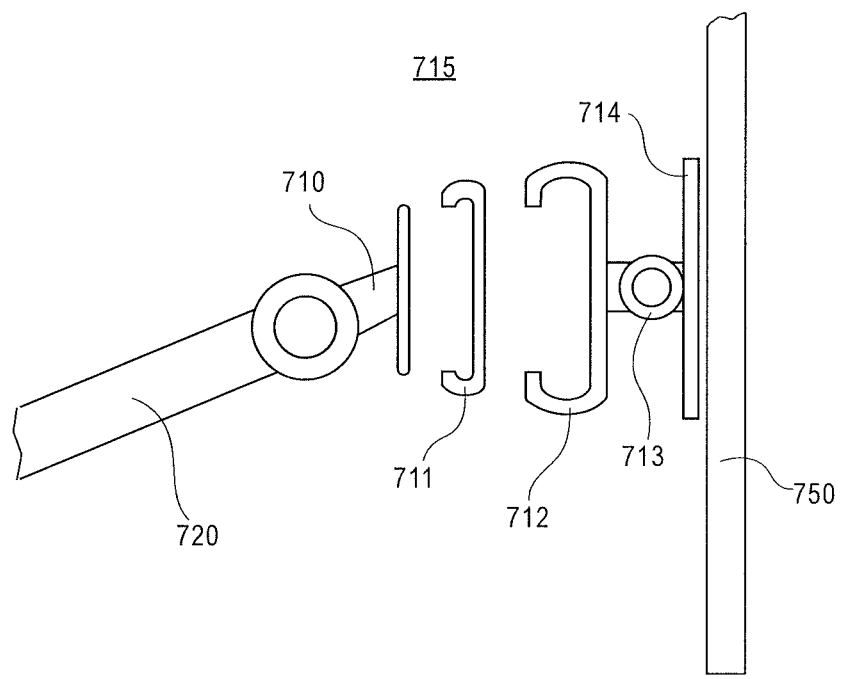
FIG. 13C is a simplified partial exploded side detailed view of the optional slider connector of the monitor arm embodiment.

FIG. 13B shows the modular monitor arm assembly in a raised position. FIG. 13C shows the optional slider connector 715 assembly which would allow the monitor 750 to be adjusted in a side to side movement and or when pivoted ninety degrees, in an up and down rotational movement by way of articulating pivot connector 713 as well. The slider connector assembly 715 can have a multitude of tracks, slide track 711 and slide track 712, in which the connection plate 710 and monitor 750 would then be slidably connected to slide side to side with each connection plate being independently slid if desired. Knurl knobs or Allen wrench screws or other selectively releasable mechanisms are utilized to lock the slidable connection plates in the desired locations, or free them for adjustment.

Figure 13D:
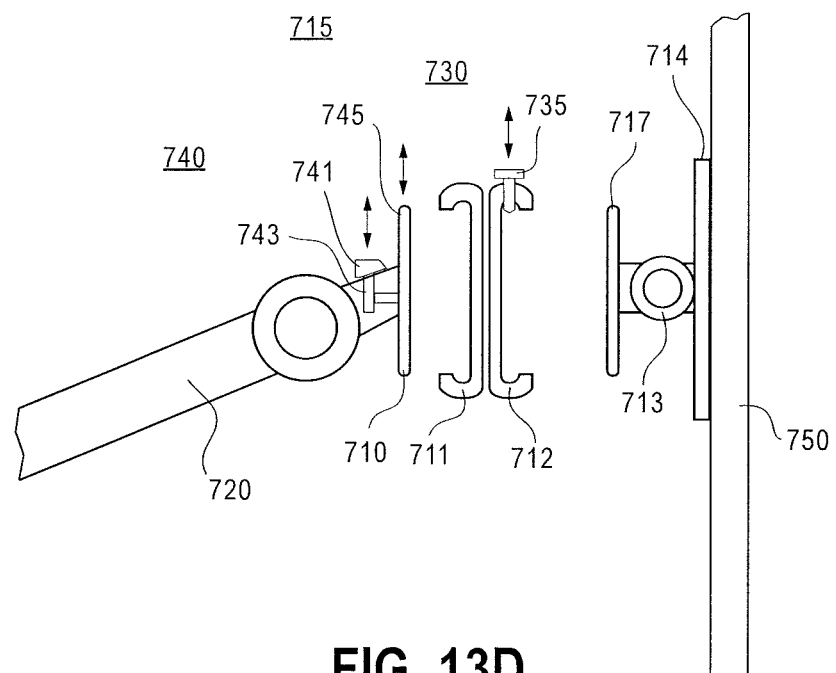
FIG. 13D is a simplified partial exploded side detailed view of the optional slider connector of the monitor arm embodiment.

FIG. 13D illustrate an alternate embodiment of the optional slider connector 715 assembly with an exposed adjustment mechanism which would allow the monitor 750 to be slidably adjusted and limited. The slider connector assembly 715 in this embodiment having a multitude of tracks, slide track 711 and slide track 712 are configured to be back to back, in which the connection plate 710 and monitor mounting plate assembly connector 717 would then be slidably connected to slide side to side independently within the corresponding slide tracks. The multitude of slide tracks allow the sliding movement to be sequential in nature and as to take up less room than having to utilize the same amount of movement in a single-track arrangement.

Knurl knobs or Allen wrench screws or other selectively releasable mechanisms may be utilized to control the sequential movement and or lock the slidable connection plates in the desired locations depending on how the operator has set the resistance mechanism settings. In this particular embodiment two adjustment methods are shown, adjustment 730 which utilizes but not limited to, a threaded insert screw into slide track 712 as a means to apply force onto plate connector 717 to impede its side to side movement; the other is adjustment 740 which utilizes a depressible actuator 714 with spring 743 biasing resistance skid 745 to apply force in unison with connector plate 710, traveling within slide track 711 to impede its side to side movement. Both adjustment mechanisms 730 by way of the adjustment knob or screw and 740 by way of adjustment knob or screw compressing the force spring 743 as to exert more force are exemplary of ways to regulate the force needed to sequentially control the lateral sliding movement with the tracks 711 and 712. Other methods to create hard stops can utilize such as an engagement pin registering into a hole or notch or any number of other similar methods if detent registrations and hard stops are desired.

Figure 13E:
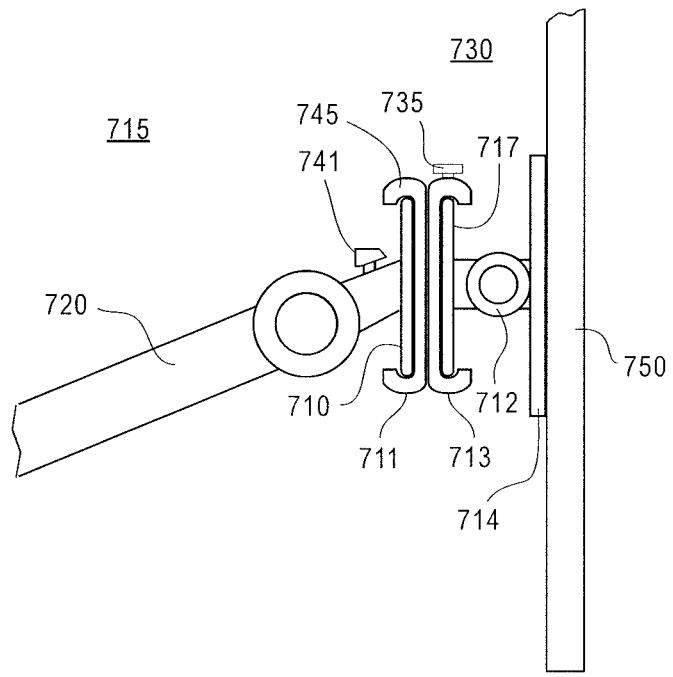
FIG. 13E is a simplified side detailed view of the optional slider connector of the monitor arm embodiment.

FIG. 13E is a simplified isometric side view of the previous exploded view in the assembled form with both exemplary adjustment mechanisms 730 and 740 are shown. One or the other method can be used interchangeably and with the addition of added detents and hard stops.

Figure 13F:
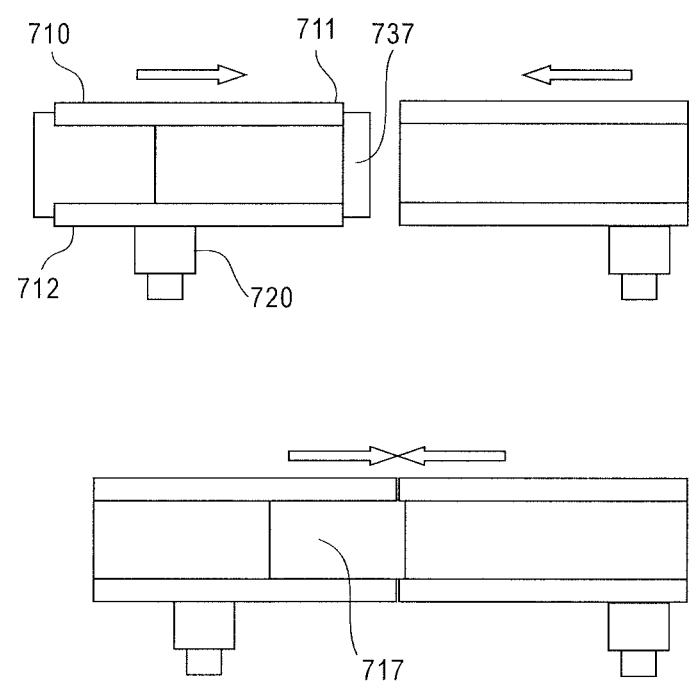
FIG. 13F is a simplified isometric front view showing how two slider assemblies may be connected.

FIG. 13F illustrates a front view showing two of the aforementioned slider assemblies being connected by the use of connector 737. Due to the plurality of slider tracks, the tracks can be interconnected by way of a connection plate such as the one illustrated, connector 737 which is partially slid into slider track 710 (rearward of track 712 shown) of both the right and left assemblies as shown. The interconnected tracks allow plate connector 717 to slide from the left assembly to the right and anywhere in-between. This type of configuration has the advantages of creating both a single, double, and larger articulating monitor arm assembly, but also allows these assemblies to interconnect and work in unison for easer adjustments and proper ergonomic articulation. Another stated advantage is the ability to offer a hybrid type of monitor arm system which can stand freely and as the user's needs progress, move towards the advantages of a track based multi-monitor support system without having the operator completely change out their existing system giving them an entire range of executable configurations never offered in this type of product line.

Figure 14A:
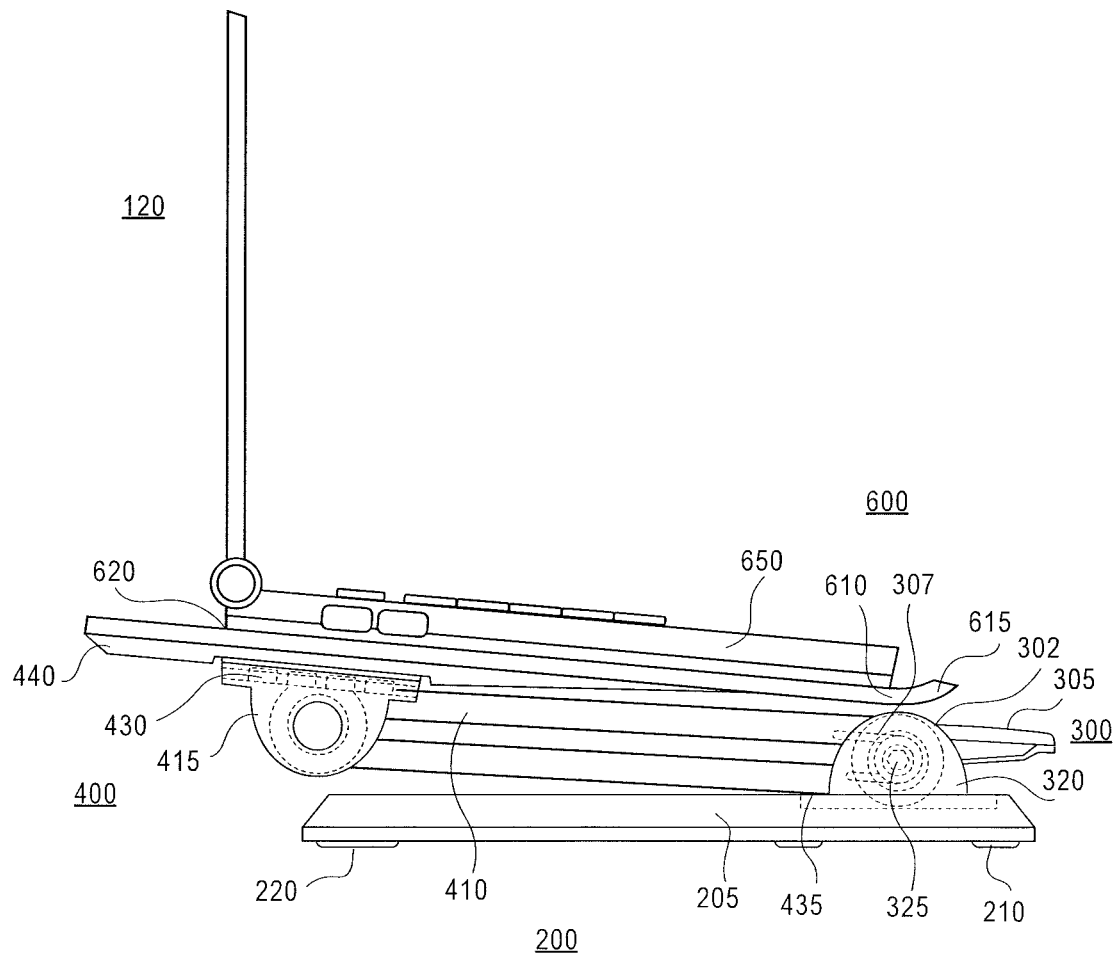
FIG. 14A is a simplified isometric side view showing the invention in the modular laptop riser embodiment in the lowered configuration.
Figure 14B:
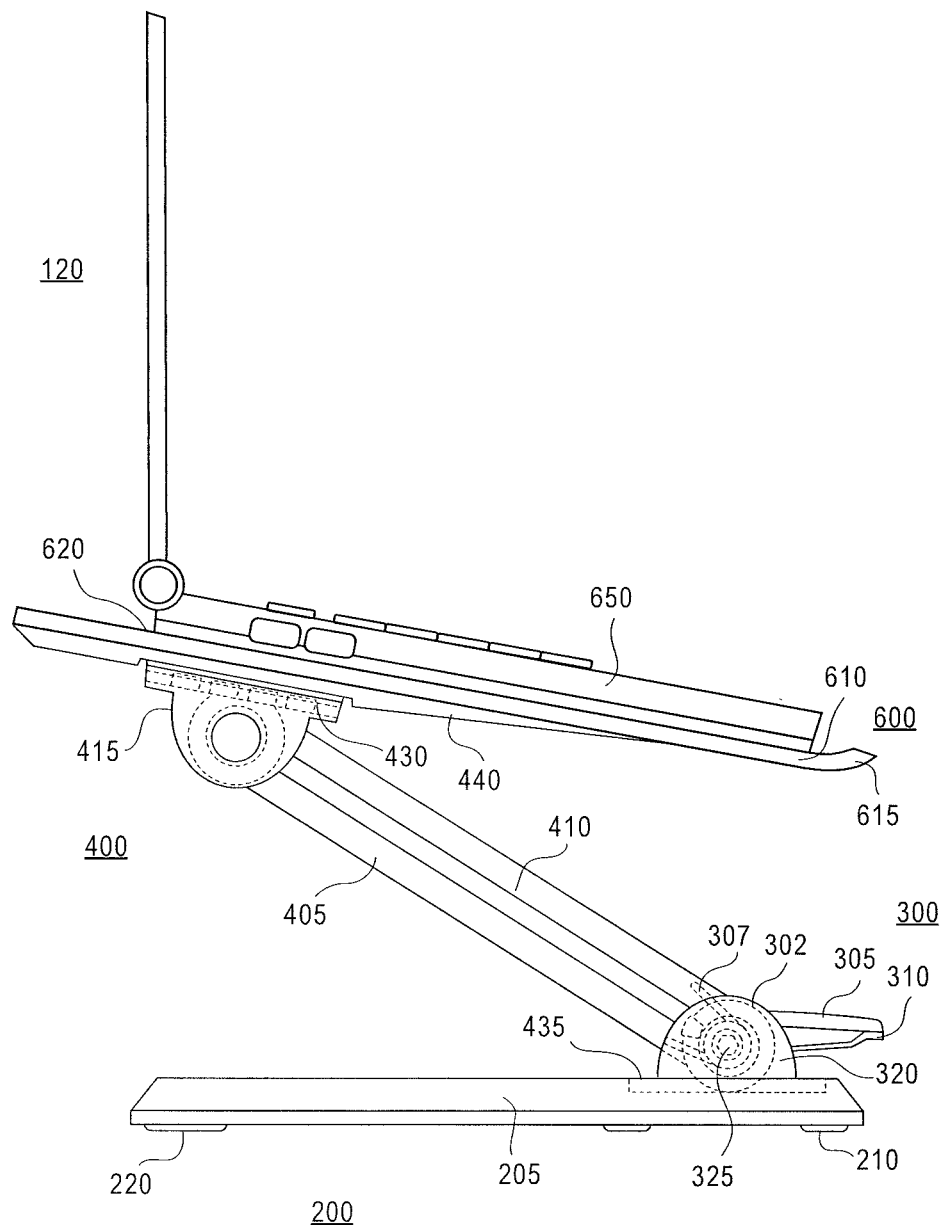
FIG. 14B is a simplified isometric side view showing the invention in the modular laptop riser embodiment in the raised configuration respectively.

FIG. 14A and FIG. 14B illustrate the invention in the modular laptop riser embodiment in the lowered and raised configuration respectively. In some embodiments, the laptop riser platform assembly 600 is attached or coupled by way of connection plate 440 and to the rest of the unit, including the articulating armature assembly 400, actuator assembly 300 and base assembly 200 allowing for laptop riser embodiment to rest upon a surface in this configuration.

In some embodiments the base assembly 200 can be replaced by a desk or table clamp system if desirous. As shown in FIG. 14A laptop 650 rests on riser surface 610 and is retained passively by surface griping elements, such as a textured thermal elastomer or other structures to resist movement of a laptop computer or other device, and upturned retainer 615 which prevents the laptop from sliding off the riser surface. The surface can be designed to allow air to flow from the sides or from under riser surface 610 by way of textured ribs or openings through the riser surface itself. In other embodiments, more active retaining elements may be used such as hook and loop latching strap mechanism or an articulating hinged retaining flap to encase the laptop partially as to secure it even when the raiser surface is at an aggressive position, such as when the riser surface 610 is raised and angled beyond a forty-five-degrees by pivoting upper four-bar connection plate 415. FIG. 14B is a simplified isometric side view of the unit showing the modular laptop riser embodiment in a raised position.

Figure 15:
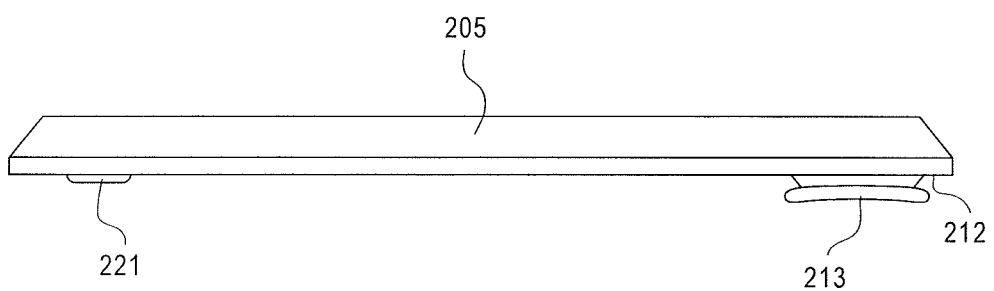
FIG. 15 is a simplified isometric side view of an alternative embodiment of base assembly.

FIG. 15 illustrates an alternate embodiment of base assembly 200 for use with the inventions disclosed herein. Base foot element 213 is constructed with an elastomeric material formed to create a suction cup design as to ensure base foot element's 213 ability to grip to the surface on which it is positioned or pressed to.

In some embodiments, the base foot element 213 is coupled to base 205 by an optionally pivotal assembly 212. With those elements, when weight is lifted off foot 221, base 205 is able to pivot around pivotal assembly 212 allowing any of the modular assemblies attached to the base to pivot as well about the pivotal assembly 212. Alternatively, base foot element 213 could be utilized to replace all of the foot elements, such as 221 to create a base assembly which is very stable and is removably applied by suction and adhesion to the surface in which its attached. This construction adds stability without having to be clamped to the surface of a desk or table.

Figure 16:
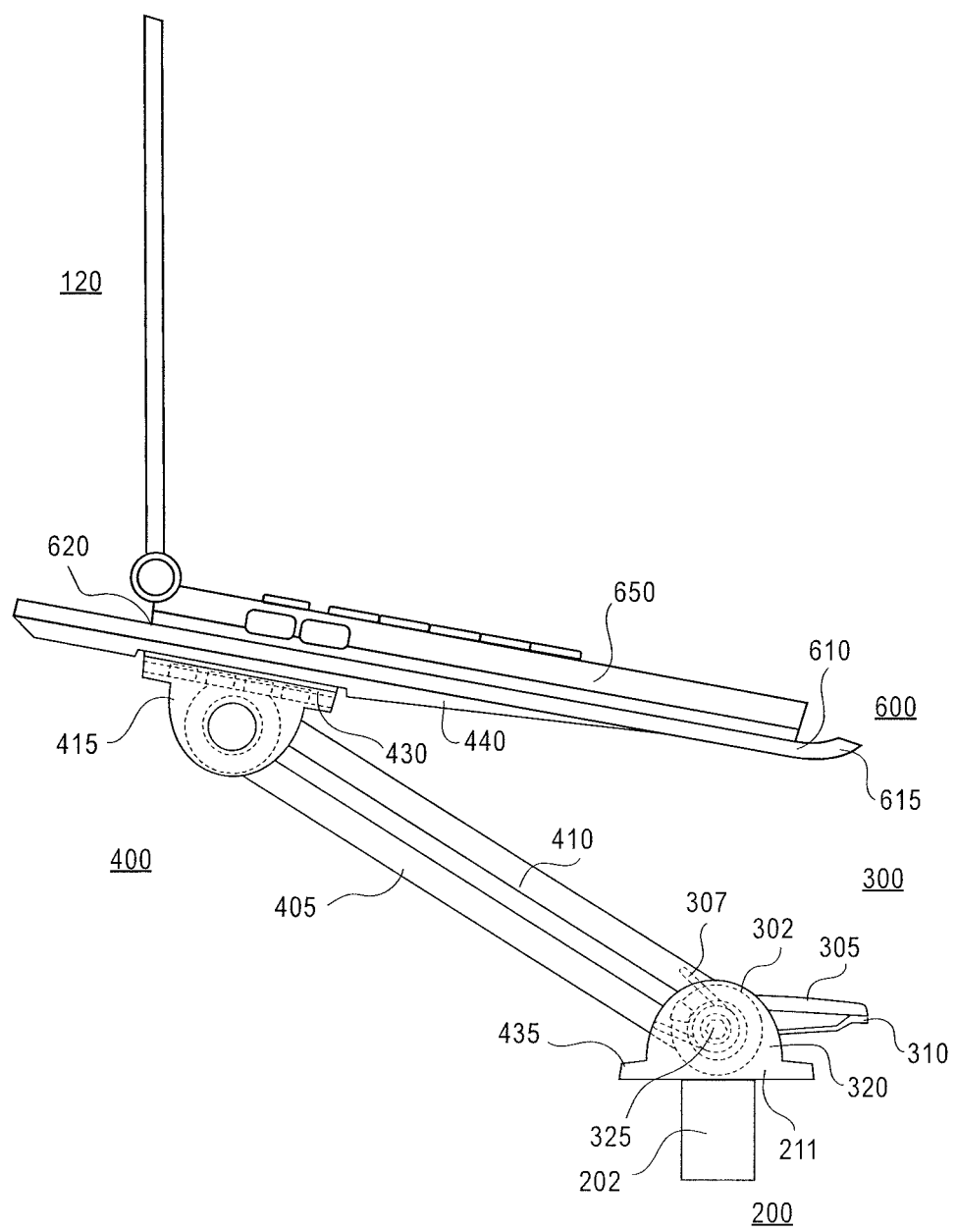
FIG. 16 is a simplified isometric side view, representing the invention in the modular laptop riser embodiment in a construct which allows the articulating armature assembly, to be attached to a monitor arm assembly.

As shown in FIG. 16, the invention in the modular laptop riser embodiment may include an articulating armature assembly 400, to be attached to a monitor arm assembly. Base assembly 200 may be removed and pole mount assembly 202 attached by way of lower four-bar connection plate 417. Using the modular laptop riser embodiment is for illustrative purposes and can be applied to other configurations if it is desirous to utilize any of the optional embodiments in pole mounted configuration.

Figure 17A:
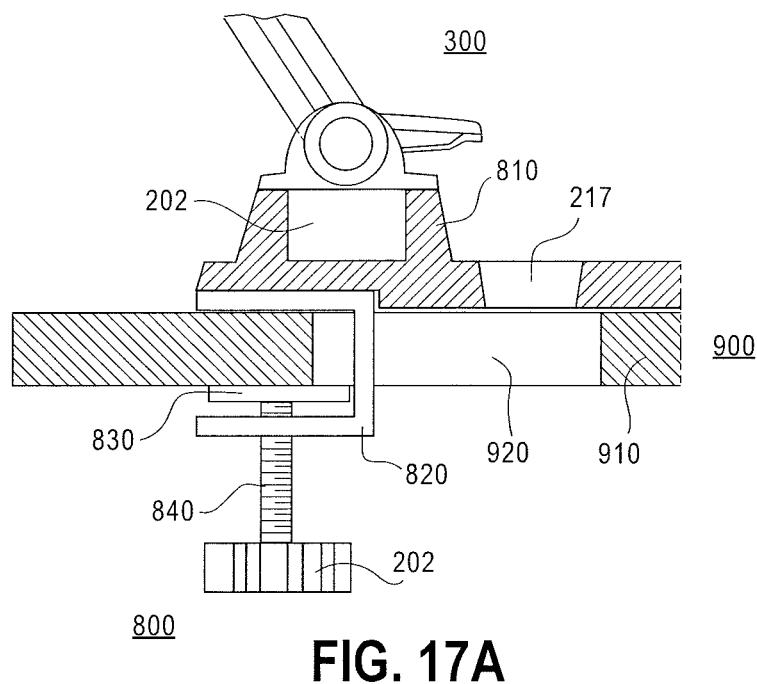
FIG. 17A is a simplified isometric side view showing the inventions alternate embodiment replacing the assembly base with a clamping assembly for clamping on the edge of a support surface.
Figure 17B:
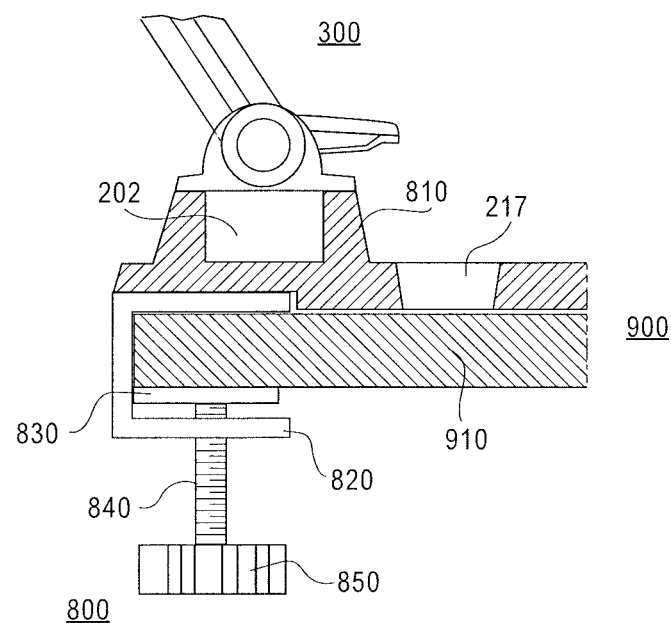
FIG. 17B is a simplified isometric side view showing the inventions alternate embodiment replacing the assembly base with a clamping assembly for clamping on a support surface having a grommet or aperture and including aligned base aperture for cord management.

With reference to FIGS. 17 and 17B, in some embodiments the assembly base of the previous embodiments may be replaced with clamp assembly 800. FIG. 17A illustrates the clamp assembly in edge clamp configuration. Clamp bracket 820 coupled to clamp base 810 as to have the distal ends of clamp bracket 820 facing towards the center of base 810 for edge clamping configuration. In this configuration a table or desktop 910 is clamped within bracket 820 with press foot 830 screwed tightly using knurl knob 850 which is attached to threaded rod element 840. The remaining modular configurations can be added or connected to the clamp assembly 800 by way of pole mount assembly 202.

In some embodiments, exemplified in FIG. 17B the clamp assembly may be in an aperture or grommet mount configuration. Clamp bracket 820 is assembled to clamp base 810 as to have the distal ends of bracket 820 facing towards the outside with vertical element of bracket 820 going through the grommet opening 920 with the table or desk top 910 is clamped within the bracket using the same method as previously described. Clamp base 810 has a cable opening 217 which should align with grommet opening 920 as to allow cabling to travel from under the table or desktop through the grommet opening 920 and cable opening 217 to the top of the table or desktop surface.

Figure 18A:
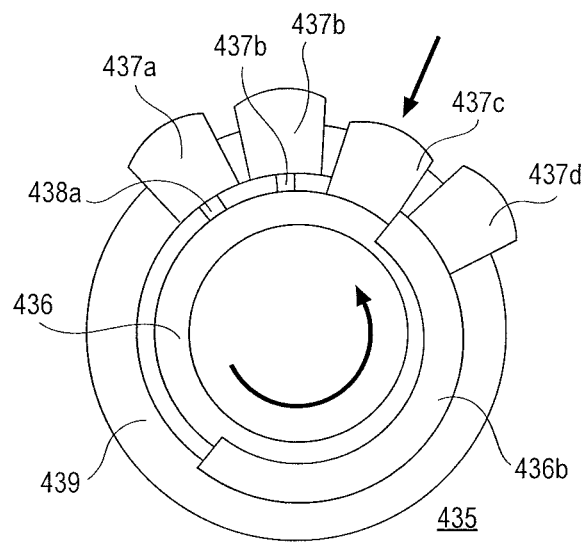
FIG. 18A is a simplified isometric side view of a user adjustable rotation limiter limiting counterclockwise rotation.
Figure 18B:
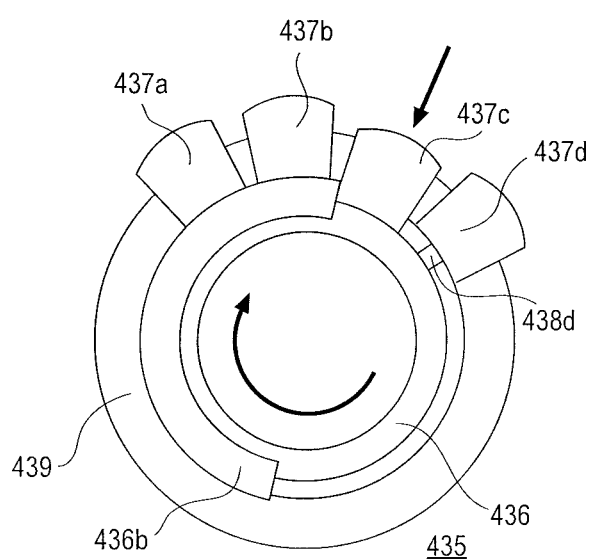
FIG. 18B is a simplified isometric side view of a user adjustable rotation limiter limiting clockwise rotation.

In some embodiments, a user adjustable rotation limiter may be included, as illustrated in FIGS. 18A and 18B. In such an embodiment, inner rotation element 436 rotates within outer rotational element 439. Limit rib 436*b* is attached to and rotates with inner rotation element 436. Limiter tabs 437*a*, 437*b*, 437*c* and 437*d* can be pushed in towards the center to limit the rotational travel of limit rib 436*b*. Similarly, the limiter tabs can be pulled out to disengage the limiters.

FIG. 18A illustrates how counterclockwise rotation is limited when limiter tab 437 is engaged. FIG. 18B illustrates how the clockwise rotation is limited when limiter tab 437 is engaged. The more limiter tabs are engaged, the more restricted the clockwise and counterclockwise rotation of the inner rotation element 436. The limiter tabs can be pulled out and disengaged as to increase the allowable rotation as well. The limiter tabs move in and out by way of corresponding limit tab guides 438*a*, 438*b*, 438*c* and 438*d*.

The illustration of these particular embodiments should not be taken as restrictive in any way since a myriad of configurations and methods using the underlying invention can be realized from what has been disclosed in this application.

The foregoing disclosure of specific embodiments is intended to be illustrative of the broad concepts comprehended by the invention.

The invention claimed is:

1. A support device for selectively elevating a platform above a working surface, the device including:
a base for resting on a work surface; an articulating armature assembly; and a platform assembly, the base coupled to the articulating armature assembly, and the articulating armature assembly coupled to the platform assembly, the articulating armature assembly having a range of elevation to selectively raise and lower the platform assembly along a path above the working surface, the range of elevation being selected by the user through an articulation actuator, the articulation actuator including a spring, the articulation actuator locking an upper limit and a lower limit of the range of elevation while allowing movement between the limits along the path.

2. The device of claim 1, wherein the articulation actuator includes an actuation lever to selectively engage the spring.

3. The device of claim 2, wherein the spring provides a counterforce to a downward force on the platform assembly when the articulating armature assembly is in an upper range of elevation.

4. The device of claim 2 further including a range controller, the range controller defining the range in which the articulating armature assembly moves.

5. The device of claim 4, wherein the spring provides counterforce to a downward force on the platform assembly, when the armature assembly moves within the range defined by the range controller.

6. The device of claim 1, further including a second spring, the second spring having a force higher than the first spring.

7. The device of claim 6, where in the first spring provides force to the articulating armature assembly in a first range of elevation, and the second spring provides force to the articulating armature assembly in a second range of elevation.

8. The device of claim 7 wherein a first actuation lever selectively engages the first spring, and a second lever selectively engages the second spring.

9. A support device for elevating a platform above a work surface, the device including:
a base; an articulating armature assembly; and a platform assembly, the base coupled to the articulating armature assembly, and the articulating armature assembly coupled to the platform assembly, the articulating armature assembly having range of elevation above the base, a spring engaged with the articulating armature assembly to provide a counterforce to a downward force on the platform assembly the range of elevation including a user selectable upper limit and a user selectable lower limit, the limits set while allowing movement between the limits.

10. The device of claim 9, wherein the spring engages with a range controller to limit the range of elevation.

11. The device of claim 9 wherein the counterforce supplied by the spring is selectively engaged by an actuation lever.

12. The device of claim 9 further including a second spring to provide a counterforce to a downward force on the platform assembly, the second spring applying its downward force when the articulating armature assembly is in a second range of elevation above the base.

13. The device of claim 12 where the second range of elevation is limited by a second range controller.

14. The device of claim 1, wherein the device includes a rotational bearing allowing the articulating armature assembly to rotate with respect to the base.

15. The device of claim 1, wherein the articulating armature assembly is a four bar assembly.

16. A support device for elevating a platform above a working surface, the device including:
a base assembly for resting on the working surface; an articulating armature assembly coupled to the base assembly; and a platform assembly coupled to the articulating armature assembly, the articulating armature assembly having a range of elevation positions along a path, the armature assembly securable in a range of elevation having an upper limit and a lower limit while allowing movement between the limits along the path, a biasing member engaged with the articulating armature assembly, the biasing member providing a counterforce against a downward force on the platform assembly when the articulating armature assembly is at an elevation higher than a lower elevation position, and a range controller engaged with the biasing member to allow a user to limit the range of elevation positions in which the biasing member applies the counterforce.

17. The device of claim 16, where the biasing member is a gas strut.

18. The device of claim 16, further including the articulating armature assembly having a second range of elevation position, the second range being higher than the first range, a second biasing member engaging the articulating armature assembly and providing a second counterforce against the downward force on the platform assembly, and a second range controller engaged with the biasing member to limit the second range of elevation positions in which the biasing member applies the second counterforce.

19. The device of claim 18 further including a TPU grommet between the base assembly and the articulating armature assembly.

* * * * *

UNITED STATES PATENT AND TRADEMARK OFFICE
CERTIFICATE OF CORRECTION

| | |
|---|---|
| PATENT NO. | : 11,666,143 B2 |
| APPLICATION NO. | : 16/874437 |
| DATED | : June 6, 2023 |
| INVENTOR(S) | : Tai Hoon Matlin, Peter Maletich and Shawn Michael Applegate |

It is certified that error appears in the above-identified patent and that said Letters Patent is hereby corrected as shown below:

In the Claims

Column 9, Line 23, Should read as follows:
9. A support device for elevating a platform above a work surface,
the device including:
    a base; an articulating armature assembly; and a platform assembly, the base
        coupled to the articulating armature assembly, and the articulating armature
        assembly coupled to the platform assembly, the articulating armature
        assembly having range of elevation along a path above the base, a spring
        engaged with the articulating armature assembly to provide a counterforce
        to a downward force on the platform assembly, the range of elevation
        including a user selectable upper limit and a user selectable lower limit,
        the limits set while allowing movement between the limits along the path.

Signed and Sealed this
Nineteenth Day of December, 2023

Katherine Kelly Vidal
*Director of the United States Patent and Trademark Office*